United States Patent
Templeman et al.

(10) Patent No.: US 9,043,843 B2
(45) Date of Patent: May 26, 2015

(54) TRANSFER OF TELEVISION PROGRAMS FROM CHANNEL-SPECIFIC FILES TO PROGRAM-SPECIFIC FILES

(71) Applicant: EchoStar Technologies, LLC, Englewood, CO (US)

(72) Inventors: Mark Templeman, Parker, CO (US); Yunfeng Yang, Aurora, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 82 days.

(21) Appl. No.: 13/793,636

(22) Filed: Mar. 11, 2013

(65) Prior Publication Data

US 2013/0247111 A1 Sep. 19, 2013

Related U.S. Application Data

(60) Provisional application No. 61/611,483, filed on Mar. 15, 2012.

(51) Int. Cl.
*H04N 7/173* (2011.01)
*G11B 27/28* (2006.01)
(Continued)

(52) U.S. Cl.
CPC .................. *G11B 27/28* (2013.01); *H04N 5/91* (2013.01); *H04N 5/50* (2013.01); *H04N 9/87* (2013.01); *H04N 9/79* (2013.01); *H04N 21/4826* (2013.01);
(Continued)

(58) Field of Classification Search
USPC ................. 725/47, 58, 52, 134, 142; 386/296
See application file for complete search history.

(56) References Cited

U.S. PATENT DOCUMENTS

| 4,706,121 A | 11/1987 | Young |
| 4,723,246 A | 2/1988 | Weldon, Jr. |

(Continued)

FOREIGN PATENT DOCUMENTS

| EP | 0 903 743 A | 3/1999 |
| EP | 0 973 333 A | 1/2000 |

(Continued)

OTHER PUBLICATIONS

International Search Report and Written Opinion of PCT/US2013/32176 mailed on Jun. 25, 2013, 15 pages.

(Continued)

*Primary Examiner* — Pankaj Kumar
*Assistant Examiner* — Reuben M Brown
(74) *Attorney, Agent, or Firm* — Kilpatrick Townsend & Stockton LLP

(57) ABSTRACT

A television receiver including a tuner and one or more processors may be presented. The television receiver may be configured to tune the tuner to a television channel. The television receiver may be configured to create and store an omnibus channel file containing a plurality of television programs broadcast consecutively on the television channel over a period of time. The television receiver may be configured to, after a predefined period of time, select the omnibus channel file for deletion. The television receiver may be configured to determine a television program to receive extended storage. The television receiver may be configured to store a portion of the omnibus channel file as an individual program file, wherein the portion of the omnibus channel file corresponds to the television program. The television receiver may be configured to, after storing the portion of the omnibus channel file, delete the omnibus channel file.

21 Claims, 8 Drawing Sheets

(51) Int. Cl.

| | | |
|---|---|---|
| *H04N 5/91* | (2006.01) | |
| *H04N 5/50* | (2006.01) | |
| *H04N 9/87* | (2006.01) | |
| *H04N 9/79* | (2006.01) | |
| *H04N 21/472* | (2011.01) | |
| *H04N 9/797* | (2006.01) | |
| *H04N 5/782* | (2006.01) | |
| *H04N 21/426* | (2011.01) | |
| *H04N 21/433* | (2011.01) | |
| *H04N 5/44* | (2011.01) | |
| *H04N 5/76* | (2006.01) | |
| *H04N 5/445* | (2011.01) | |
| *H04N 7/16* | (2011.01) | |
| *H04N 21/482* | (2011.01) | |
| *H04N 7/20* | (2006.01) | |

(52) U.S. Cl.
CPC ........ *H04N 21/47217* (2013.01); *H04N 21/482* (2013.01); *H04N 7/20* (2013.01); *H04N 9/797* (2013.01); *H04N 5/782* (2013.01); *H04N 21/4263* (2013.01); *H04N 21/4334* (2013.01); *H04N 21/47214* (2013.01); *H04N 5/4401* (2013.01); *H04N 5/76* (2013.01)

(56) References Cited

U.S. PATENT DOCUMENTS

| | | | |
|---|---|---|---|
| 4,802,215 | A | 1/1989 | Mason |
| 5,187,589 | A | 2/1993 | Kono et al. |
| 5,335,277 | A | 8/1994 | Harvey et al. |
| 5,483,277 | A | 1/1996 | Granger |
| 5,488,658 | A | 1/1996 | Hirashima |
| 5,541,738 | A | 7/1996 | Mankovitz |
| 5,642,153 | A | 6/1997 | Chaney et al. |
| 5,684,969 | A | 11/1997 | Ishida |
| 5,805,763 | A | 9/1998 | Lawler et al. |
| 5,974,218 | A | 10/1999 | Nagasaka et al. |
| 6,628,891 | B1 | 9/2003 | Vantalon et al. |
| 6,701,528 | B1 | 3/2004 | Arsenault et al. |
| 6,766,523 | B2 | 7/2004 | Herley |
| 6,798,971 | B2 | 9/2004 | Potrebic |
| 6,938,208 | B2 | 8/2005 | Reichardt |
| 7,024,676 | B1 | 4/2006 | Klopfenstein |
| 7,409,140 | B2 | 8/2008 | Rodriguez et al. |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,715,552 | B2 | 5/2010 | Pinder et al. |
| 7,730,517 | B1 | 6/2010 | Rey et al. |
| 7,739,711 | B2 | 6/2010 | Finseth et al. |
| 7,760,986 | B2 | 7/2010 | Beuque |
| 7,804,861 | B2 | 9/2010 | Kim |
| 7,848,618 | B2 | 12/2010 | Potrebic et al. |
| 7,856,557 | B2 | 12/2010 | Beuque |
| 7,926,078 | B2 | 4/2011 | Arsenault et al. |
| 7,929,697 | B2 | 4/2011 | McNeely et al. |
| 7,962,937 | B2 | 6/2011 | Cho et al. |
| 8,006,268 | B2 | 8/2011 | Sloo |
| 8,201,194 | B2 | 6/2012 | Wijnands et al. |
| 8,321,466 | B2 | 11/2012 | Black et al. |
| 8,437,622 | B2 | 5/2013 | Casagrande |
| 8,447,170 | B2 | 5/2013 | Casagrande |
| 8,566,873 | B2 | 10/2013 | Sie et al. |
| 8,584,167 | B2 | 11/2013 | Vanduyn |
| 8,606,088 | B2 | 12/2013 | Kummer et al. |
| 8,627,349 | B2 | 1/2014 | Kirby et al. |
| 8,660,412 | B2 | 2/2014 | Kummer et al. |
| 8,774,608 | B2 | 7/2014 | Kummer et al. |
| 8,819,722 | B2 | 8/2014 | Kummer et al. |
| 8,850,476 | B2 | 9/2014 | VanDuyn et al. |
| 2001/0028782 | A1 | 10/2001 | Ohno et al. |
| 2001/0033736 | A1 | 10/2001 | Yap et al. |
| 2001/0034787 | A1 | 10/2001 | Takao et al. |
| 2002/0044658 | A1 | 4/2002 | Wasilewski et al. |
| 2002/0054752 | A1* | 5/2002 | Wood et al. ..................... 386/83 |
| 2002/0055343 | A1 | 5/2002 | Stetzler et al. |
| 2002/0087983 | A1 | 7/2002 | Son et al. |
| 2002/0092021 | A1 | 7/2002 | Yap et al. |
| 2002/0095510 | A1 | 7/2002 | Sie et al. |
| 2002/0097340 | A1 | 7/2002 | Takagi et al. |
| 2002/0144266 | A1 | 10/2002 | Goldman et al. |
| 2002/0152299 | A1 | 10/2002 | Traversat et al. |
| 2002/0164147 | A1 | 11/2002 | Suda |
| 2002/0168178 | A1 | 11/2002 | Rodriguez et al. |
| 2002/0188943 | A1 | 12/2002 | Freeman et al. |
| 2003/0026423 | A1 | 2/2003 | Unger et al. |
| 2003/0110514 | A1 | 6/2003 | West et al. |
| 2003/0152360 | A1* | 8/2003 | Mukai et al. ..................... 386/46 |
| 2003/0156826 | A1* | 8/2003 | Sonoda et al. ................... 386/83 |
| 2003/0177495 | A1 | 9/2003 | Needham et al. |
| 2003/0200548 | A1 | 10/2003 | Baran et al. |
| 2003/0208763 | A1 | 11/2003 | McElhatten et al. |
| 2004/0001087 | A1 | 1/2004 | Warmus et al. |
| 2004/0015992 | A1 | 1/2004 | Hasegawa et al. |
| 2004/0015999 | A1 | 1/2004 | Carlucci et al. |
| 2004/0103428 | A1 | 5/2004 | Seok et al. |
| 2004/0162871 | A1 | 8/2004 | Pabla et al. |
| 2004/0218905 | A1 | 11/2004 | Green et al. |
| 2004/0242150 | A1 | 12/2004 | Wright et al. |
| 2004/0268387 | A1 | 12/2004 | Wendling |
| 2005/0120049 | A1 | 6/2005 | Kanegae et al. |
| 2005/0125683 | A1 | 6/2005 | Matsuyama et al. |
| 2005/0229213 | A1 | 10/2005 | Ellis et al. |
| 2005/0271365 | A1 | 12/2005 | Hisatomi |
| 2006/0056800 | A1 | 3/2006 | Shimagami et al. |
| 2006/0206819 | A1 | 9/2006 | Tsuji et al. |
| 2006/0212900 | A1* | 9/2006 | Ismail et al. ..................... 725/34 |
| 2006/0215993 | A1 | 9/2006 | Yamada |
| 2006/0274208 | A1 | 12/2006 | Pedlow, Jr. |
| 2007/0016546 | A1 | 1/2007 | De Vorchik et al. |
| 2007/0039032 | A1 | 2/2007 | Goldey et al. |
| 2007/0061378 | A1 | 3/2007 | Lee et al. |
| 2007/0157253 | A1 | 7/2007 | Ellis et al. |
| 2007/0165855 | A1 | 7/2007 | Inui |
| 2007/0192586 | A1 | 8/2007 | McNeely |
| 2007/0204288 | A1 | 8/2007 | Candelore |
| 2007/0234395 | A1 | 10/2007 | Dureau et al. |
| 2007/0258596 | A1 | 11/2007 | Kahn et al. |
| 2008/0046929 | A1 | 2/2008 | Cho et al. |
| 2008/0092164 | A1 | 4/2008 | Agarwal et al. |
| 2008/0104534 | A1 | 5/2008 | Park et al. |
| 2008/0137850 | A1 | 6/2008 | Mamidwar |
| 2008/0141322 | A1 | 6/2008 | Jang et al. |
| 2008/0152039 | A1 | 6/2008 | Shah et al. |
| 2008/0184327 | A1 | 7/2008 | Ellis et al. |
| 2008/0216119 | A1 | 9/2008 | Pfeffer et al. |
| 2008/0216136 | A1 | 9/2008 | Pfeffer et al. |
| 2008/0222678 | A1* | 9/2008 | Burke et al. ..................... 725/44 |
| 2008/0222681 | A1 | 9/2008 | Kwon |
| 2008/0271077 | A1 | 10/2008 | Kim et al. |
| 2008/0273698 | A1 | 11/2008 | Manders et al. |
| 2008/0276284 | A1 | 11/2008 | Bumgardner et al. |
| 2008/0288461 | A1 | 11/2008 | Glennon et al. |
| 2008/0291206 | A1 | 11/2008 | Uchimura et al. |
| 2008/0298585 | A1 | 12/2008 | Maillard et al. |
| 2008/0301740 | A1* | 12/2008 | Tsutsui ........................... 725/92 |
| 2009/0051579 | A1 | 2/2009 | Inaba et al. |
| 2009/0067621 | A9 | 3/2009 | Wajs |
| 2009/0080930 | A1 | 3/2009 | Shinotsuka et al. |
| 2009/0100466 | A1 | 4/2009 | Migos |
| 2009/0165057 | A1 | 6/2009 | Miller et al. |
| 2009/0172722 | A1 | 7/2009 | Kahn et al. |
| 2009/0178098 | A1 | 7/2009 | Westbrook et al. |
| 2009/0254962 | A1 | 10/2009 | Hendricks et al. |
| 2009/0260038 | A1 | 10/2009 | Acton et al. |
| 2009/0320073 | A1 | 12/2009 | Reisman |
| 2010/0020794 | A1 | 1/2010 | Cholas et al. |
| 2010/0037282 | A1 | 2/2010 | Iwata et al. |
| 2010/0050225 | A1 | 2/2010 | Bennett |

(56) References Cited

U.S. PATENT DOCUMENTS

| | | |
|---|---|---|
| 2010/0086277 A1 | 4/2010 | Craner |
| 2010/0100899 A1 | 4/2010 | Bradbury et al. |
| 2010/0115121 A1* | 5/2010 | Roos et al. .................... 709/231 |
| 2010/0135639 A1 | 6/2010 | Ellis et al. |
| 2010/0158479 A1 | 6/2010 | Craner |
| 2010/0158480 A1 | 6/2010 | Jung et al. |
| 2010/0169926 A1 | 7/2010 | Westberg et al. |
| 2010/0195827 A1 | 8/2010 | Lee et al. |
| 2010/0239228 A1 | 9/2010 | Sano |
| 2010/0247067 A1 | 9/2010 | Gratton |
| 2010/0265391 A1 | 10/2010 | Muramatsu et al. |
| 2010/0284537 A1 | 11/2010 | Inbar |
| 2010/0313222 A1 | 12/2010 | Lee et al. |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0131413 A1 | 6/2011 | Moon et al. |
| 2011/0138169 A1 | 6/2011 | Michel |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0255002 A1 | 10/2011 | Witheiler |
| 2011/0311045 A1 | 12/2011 | Candelore et al. |
| 2012/0278837 A1 | 11/2012 | Curtis et al. |
| 2012/0296745 A1 | 11/2012 | Harper et al. |
| 2012/0311534 A1 | 12/2012 | Fox et al. |
| 2012/0311634 A1 | 12/2012 | Van Duyn |
| 2013/0014146 A1 | 1/2013 | Bhatia et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1* | 9/2013 | Martch et al. .................... 725/46 |
| 2013/0247107 A1 | 9/2013 | Templeman |
| 2013/0247111 A1* | 9/2013 | Templeman et al. ........... 725/55 |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/028824 A3 | 2/2013 |
| WO | 2013/138606 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2013/031565 mailed on May 31, 2013, 103 pages.

International Search Report and Written Opinion of PCT/US2013/031915 mailed on Jun. 3, 2013, 7 pages.

U.S. Appl. No. 13/795,914, filed Mar. 6, 2013, Non-Final Office Action mailed Oct. 11, 2013, 17 pages.

International Search Report of PCT/KR2007/003521 mailed on Oct. 23, 2007.

International Search Report of PCT/IB2003/005737 mailed on Mar. 3, 2004.

Jensen, Craig, "Fragmentation: the condition, the cause, the cure" 'Online!, Executive Software International, 1994; retrieved from Internet: <URL: www.executive.com/fragbook.htm> retrieved on Mar. 2, 2004!* Chapter: "How a disk works", Section: "The original problem".

International Search Report and Written Opinion of PCT/US2012/51992 mailed Nov. 2, 2012, 15 pages.

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Preliminary Report on Patentability for PCT/US2012/052002 mailed on Apr. 17, 2014, 10 pages.

International Search Report and Written Opinion of PCT/US2012/51964 mailed Nov. 2, 2012, 13 pages.

International Search Report and Written Opinion of PCT/US2012/052011 mailed Dec. 17, 2012, 44 pages.

International Preliminary Report on Patentability, PCT/US2012/052011, mailed on Mar. 6, 2014, 6 pages.

International Preliminary Report on Patentability, PCT/US2012/051984, mailed on Mar. 6, 2014, 8 pages.

International Preliminary Report on Patentability, PCT/US2012/051964, mailed on Apr. 10, 2014, 7 pages.

International Preliminary Report on Patentability, PCT/US2012/051992, mailed on Apr. 3, 2014, 7 pages.

International Preliminary Report on Patentability, PCT/US2012/051987, mailed on Mar. 6, 2014, 7 pages.

Author Unknown, "Move Networks is Delivering the Next Generation of Television," Move Networks, 2010, obtained online at http://movenetworks.com/, 2 pages.

Jung, J., et al., "Design and Implementation of a Multi-Stream CableCARD with a High-Speed DVB-Common Descrambler," ACM Multimedia, 2006, 4 pages.

U.S. Appl. No. 13/149,852, filed May 31, 2011, Non-Final Office Action mailed Dec. 12, 2012, 9 pages.

U.S. Appl. No. 13/149,852, filed May 31, 2011, Final Office Action mailed Mar. 26, 2013, 13 pages.

U.S. Appl. No. 13/149,852, filed May 31, 2011, Notice of Allowance mailed Jul. 11, 2013, 13 pages.

U.S. Appl. No. 13/286,157, filed Oct. 31, 2011, Non-Final Office Action mailed Jan. 17, 2013, 20 pages.

U.S. Appl. No. 13/286,157, filed Oct. 31, 2011, Non-Final Office Action mailed Jul. 25, 2013, 49 pages.

U.S. Appl. No. 13/286,157, filed Oct. 31, 2011, Notice of Allowance mailed Feb. 3, 2014, 81 pages.

U.S. Appl. No. 13/215,702, filed Aug. 23, 2011, Notice of Allowance mailed Feb. 11, 2013, 13 pages.

U.S. Appl. No. 13/288,002, filed Nov. 2, 2011, Non-Final Office Action mailed Sep. 26, 2013, 15 pages.

U.S. Appl. No. 12/288,002, filed Nov. 2, 2011, Final Office Action mailed Mar. 27, 2014, 20 pages.

(56) References Cited

OTHER PUBLICATIONS

U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2012, 23 pages.
U.S. Appl. No. 13/324,831, filed Dec. 13, 2011, Non-Final Office Action mailed Feb. 28, 2013, 23 pages.
U.S. Appl. No. 13/324,831, filed Dec. 13, 2011, Notice of Allowance mailed Sep. 4, 2013, 22 pages.
U.S. Appl. No. 13/292,047, filed Nov. 8, 2011, Non-Final Office Action mailed Jan. 18, 2013, 17 pages.
U.S. Appl. No. 13/292,047, filed Nov. 8, 2011, Final Office Action mailed Aug. 19, 2013, 17 pages.
U.S. Appl. No. 13/614,899, filed Sep. 13, 2012, Non-Final Office Action mailed Feb. 5, 2013, 17 pages.
U.S. Appl. No. 13/614,899, filed Sep. 13, 2013, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 13/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/800,477, filed Mar. 13, 2013 Non-Final Office Action mailed Sep. 11, 2014, 34 pages.

* cited by examiner

TRANSFER OF TELEVISION PROGRAMS FROM CHANNEL-SPECIFIC FILES TO PROGRAM-SPECIFIC FILES

CROSS-REFERENCES TO RELATED APPLICATIONS

This Application claims priority to U.S. provisional application 61/611,483, filed Mar. 15, 2012, entitled "Reception, Recording, Storage, and Manipulation of Multiple Television Channels", the entire disclosure of which is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a television receiver is presented. The television receiver may include a tuner. The television receiver may include one or more processors. The television receiver may include a non-transitory computer-readable storage medium communicatively coupled with and readable by the one or more processors and having stored therein processor-readable instructions. When executed by the one or more processors, the instructions may cause the one or more processors to tune the tuner to a television channel. The instructions may cause the one or more processors to create and store an omnibus channel file containing a plurality of television programs broadcast consecutively on the television channel over a period of time. The instructions may cause the one or more processors to, after a predefined period of time, select the omnibus channel file for deletion. The instructions may cause the one or more processors to determine a television program of the plurality of television programs that is to receive extended storage. The instructions may cause the one or more processors to store a portion of the omnibus channel file as an individual program file, wherein the portion of the omnibus channel file corresponds to the television program of the plurality of television programs. The instructions may cause the one or more processors to, after storing the portion of the omnibus channel file, delete the omnibus channel file.

Embodiments of such a television receiver may include one or more of the following: The instructions may cause the one or more processors to receive a user-provided indication that requests extended storage of the television program of the plurality of television programs. The processor-readable instructions, which are configured to cause the one or more processors to determine the television program of the plurality of television programs that is to receive extended storage may use the user-provided indication in performing the determination. The processor-readable instructions, which are configured to cause the one or more processors to record the omnibus channel file containing the plurality of television programs broadcast consecutively on the television channel over the period of time to the non-transitory computer-readable storage medium, may be further configured to cause the omnibus channel file to be recorded to a first folder of the non-transitory computer-readable storage medium; and the processor-readable instructions, which are configured to cause the one or more processors to store the portion of the omnibus channel file as the individual program file, may be further configured to cause the individual program file to be stored to a second folder of the non-transitory computer-readable storage medium. The processor-readable instructions, which are configured to cause the one or more processors to tune the tuner to the television channel, may be further configured to cause the tuner to tune to a transponder stream comprising packetized data for a plurality of television channels that comprises the television channel.

Additionally or alternatively, embodiments of such a television receiver may include one or more of the following: The instructions may cause the one or more processors to record omnibus channel files for each television channel of the plurality of television channels over the period of time. The instructions may cause the one or more processors to maintain a catalog database stored by the non-transitory computer-readable storage medium, wherein the catalog database indicates: a plurality of omnibus channel files stored by the television receiver; and a plurality of television program identifiers, wherein each television program identifier of the plurality of television program identifiers corresponds to a television program that is stored within the plurality of omnibus channel files. The catalog database may further indicate a plurality of byte offsets, wherein each byte offset is linked to a television program identifier of the plurality of television program identifiers. Each byte offset may indicate a number of bytes preceding a designated start point of a television program within an omnibus channel file of the plurality of omnibus channel files, wherein the designated start point is based on an electronic programming guide event transition.

Additionally or alternatively, embodiments of such a television receiver may include one or more of the following: The instructions may cause the one or more processors to, while recording the omnibus channel file, when an electronic programming guide event transition corresponding to the television program occurs, determine a byte offset within the omnibus channel file corresponding to the television program using a file size determination of the omnibus channel file. The instructions may cause the one or more processors to create a non-segmented omnibus bookmark file linked with the omnibus channel file, wherein the non-segmented omnibus bookmark file indicates: electronic programming guide information for each television program within the omnibus channel file; and packet identifiers for audio and video streams within the omnibus channel file. The instructions may cause the one or more processors to delete the omnibus bookmark file from the non-transitory computer-readable storage medium when deleting the omnibus channel file from the non-transitory computer-readable storage medium. The instructions may cause the one or more processors to, after creating the non-segmented omnibus bookmark file, create a segmented bookmark file. The segmented bookmark file may identify a plurality of segments within the omnibus channel file identified by the television distribution service provider. Each segment of the plurality of segments may be defined based on a positive frame offset and a negative frame offset from a frame that corresponds to a string of characters being present in closed captioning data. The instructions may cause the one or more processors to determine if an omnibus bookmark file exists for the television program to receive extended storage. The processor-readable instructions which, when executed by the one or more processors, may be configured to cause the one or more processors to store the portion of the omnibus channel file to the individual program file, are further configured to: based on the segmented bookmark file existing, define the start and end of the portion based on the segmented bookmark file.

In some embodiments, a method for storing a television program is presented. The method may include tuning, by a television receiver, a tuner to a television channel. The method may include creating and storing, by the television receiver, an omnibus channel file containing a plurality of television programs broadcast consecutively on the television channel over a period of time. The method may include, after a predefined period of time, selecting, by the television receiver, the omnibus channel file for deletion. The method may include determining, by the television receiver, a television program of the plurality of television programs that is to receive extended storage. The method may include storing, by the television receiver, a portion of the omnibus channel file as an individual program file, wherein the portion of the omnibus channel file corresponds to the television program of the plurality of television programs. The method may include, after storing the portion of the omnibus channel file, deleting, by the television receiver, the omnibus channel file.

Embodiments of such a method may include one or more of the following: The method may include receiving, by the television receiver, a user-provided indication that requests extended storage of the television program of the plurality of television programs. Determining the television program of the plurality of television programs that is to receive extended storage may comprise using the user-provided indication in performing the determination. Recording the omnibus channel file containing the plurality of television programs broadcast consecutively on the television channel over the period of time to the non-transitory computer-readable storage medium, may include causing the omnibus channel file to be recorded to a first folder of the non-transitory computer-readable storage medium. The method may include storing the portion of the omnibus channel file as the individual program file comprises causing the individual program file to be stored to a second folder of the non-transitory computer-readable storage medium. Tuning the tuner to the television channel may include tuning to a transponder stream comprising packetized data for a plurality of television channels that comprises the television channel. The method may further include recording omnibus channel files for each television channel of the plurality of television channels over the period of time. The method may include maintaining, by the television receiver, a catalog database stored by the non-transitory computer-readable storage medium, wherein the catalog database indicates: a plurality of omnibus channel files stored by the television receiver; and a plurality of television program identifiers, wherein each television program identifier of the plurality of television program identifiers corresponds to a television program that is stored within the plurality of omnibus channel files.

Additionally or alternatively, embodiments of such a method may include one or more of the following: The catalog database may further indicate a plurality of byte offsets, wherein each byte offset is linked to a television program identifier of the plurality of television program identifiers. Each byte offset may indicate a number of bytes preceding a designated start point of a television program within an omnibus channel file of the plurality of omnibus channel files, wherein the designated start point is based on an electronic programming guide event transition. The method may include, while recording the omnibus channel file, when an electronic programming guide event transition corresponding to the television program occurs, determining a byte offset within the omnibus channel file corresponding to the television program using a file size determination of the omnibus channel file. The method may include creating, by the television receiver, a non-segmented omnibus bookmark file linked with the omnibus channel file, wherein the non-segmented omnibus bookmark file indicates: electronic programming guide information for each television program within the omnibus channel file; and packet identifiers for audio and video streams within the omnibus channel file. The method may include deleting, by the television receiver, the omnibus bookmark file from the non-transitory computer-readable storage medium when deleting the omnibus channel file from the non-transitory computer-readable storage medium. The method may include, after creating the non-segmented omnibus bookmark file, creating, by the television receiver, a segmented bookmark file, wherein: the segmented bookmark file identifies a plurality of segments within the omnibus channel file identified by the television distribution service provider.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
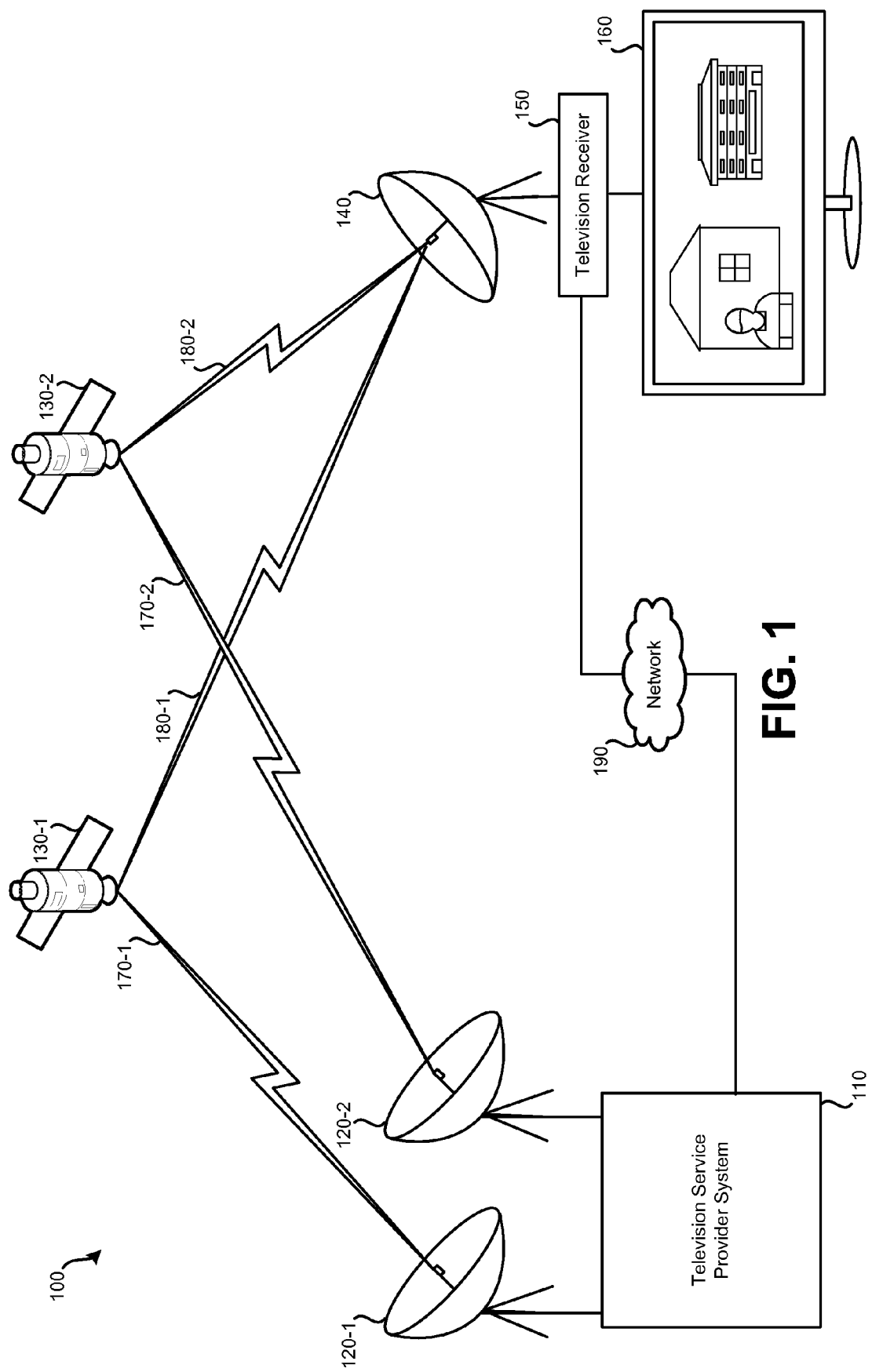
FIG. 1 illustrates an embodiment of a satellite television distribution system.

A television viewer, referred to as a user, may use a stand-alone or integrated digital video recorder (DVR) to record broadcast television programming for viewing at a later time. In some situations, rather than recording individual television programs, a television channel may be recorded for a period of time, such as during primetime (which may be from 8-10 PM, 7-9 PM, 7-10 PM, etc.). The recording of a television channel for such a period of time may be defined by the television service provider. During this period of time which the television channel is recorded, multiple television programs may be broadcast on the television channel. For example, sitcoms may tend to be scheduled for thirty minutes, including commercials; dramas may tend to be scheduled for an hour including commercials. Recording of a television channel, such as during primetime, for multiple hours, may result in two or more, possibly six, television programs being recorded.

In some embodiments, rather than a single television channel being recorded at a given time, multiple, such as four, television channels may be recorded over a given time period. For example, during weekday primetime hours, all of the major networks may be simultaneously recorded for the same period of time. Such recording may permit a user to view any television program that was broadcast during primetime on one of the major networks at a later time.

Whether a single or multiple television channels are recorded simultaneously, it may be efficient to record a single file for each television channel, with the single file storing multiple television programs broadcast on the television channel during the recording. As an example, if "Network 1" is recorded for 2 hours, a single file may be recorded and stored, with the single file containing each of the television programs broadcast during the period of time recorded.

While, perhaps ideally, the recorded television programs would be stored and available for playback indefinitely, storage limitations at the user's DVR may necessitate that, as additional television programming is recorded, other television programming be deleted. As an example, if primetime television programming is recorded on each weekday night, it may be efficient to only store the television programming for a predefined period of time, such as the past two weeks. After this time period, unless indicated by a user, the television programming may be deleted. As such, at any given time, a user may have access to the previous two weeks of television programming on television stations recorded during primetime (or some other predefined period of time). The television channels, the dates, and the time period during which multiple television channels are recorded into channel-specific files may be defined by a television service provider (e.g., satellite television service provider, cable television service provider, IP television service provider). The storage arrangement on which the channel-specific files are stored may be devoted to recordings made based on a configuration by the television service provider.

During the period of time when the television programs are stored in channel-specific files, a user may be permitted to individually select and watch any of the television programs contained in the channel-specific files. At the end of a predetermined period of time, such as two weeks, the channel-specific file associated with a television channel may be selected for deletion. However, within this file, may be one or more television programs that a user desires to continue to store for possible viewing at a later time. Such television programs may be indicated by the user and may continue to be stored.

When the channel-specific file is to be deleted, one or more television programs within the channel-specific file may be transferred to a user-managed storage arrangement, such as a different storage device (e.g., a separate hard drive), a different folder residing on a storage device, or a separate partition (e.g., a separate partition of a hard drive used to store to the channel-specific files). The portion of the channel-specific file corresponding to the television program may be transferred (e.g., copied, moved) to the storage arrangement managed by the user. Once transferred, the television program selected by the user may be maintained indefinitely (e.g., until the user selects the television program for deletion). In the user-managed storage arrangement, television programs may be stored in individual files for each television program, while in the television service provider managed partition, television programs may be stored in television channel-specific files that contain multiple television programs broadcast consecutively.

In addition to the audio and video of television programs being stored in television channel-specific files (and being transferred to program-specific files on another storage arrangement at the discretion of a user), other files may be maintained similarly. For instance, non-segmented bookmark files and segmented bookmark files, as defined and detailed in this document, may be managed to permit a transition between channel-specific files and program-specific files.

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
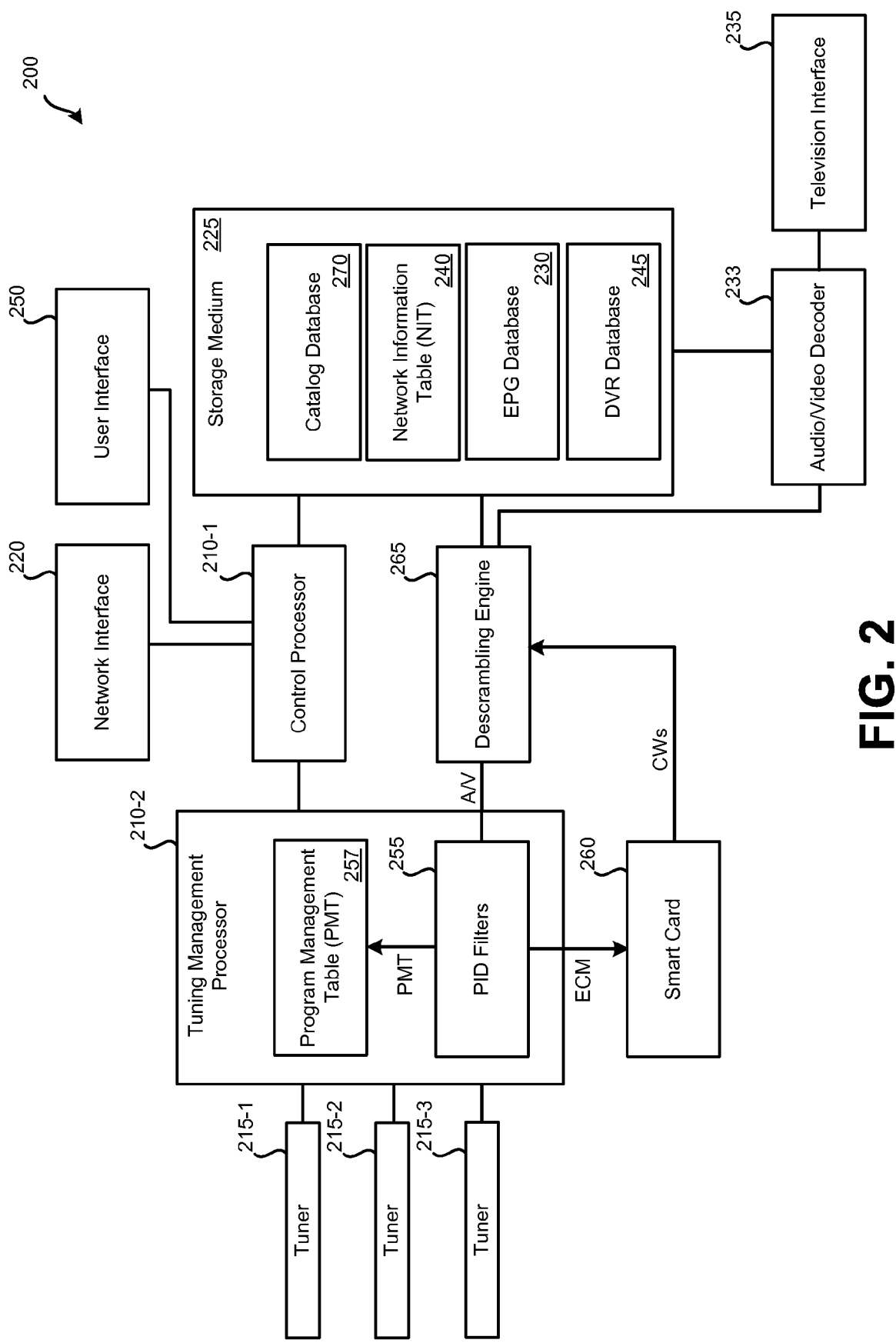
FIG. 2 illustrates an embodiment of a television receiver that is configured to extract a television program from a recorded omnibus channel file.

In communication with satellite dish 140 may be one or more sets of receiving equipment. Receiving equipment may be configured to decode signals received from satellites 130 via satellite dish 140 for display on a display device, such as display device 160. Receiving equipment, including a television receiver, may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that in other embodiments, similar functions may be performed by a television receiver integrated with display device 160.

Display device 160 may be used to present video and/or audio decoded by television receiver 150. Television receiver 150 may also output a display of one or more interfaces to display device 160, such as an electronic programming guide (EPG). Display device 160 may be a television. In some embodiments, a display device other than a television may be used, such as a monitor.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received, television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). A STB may contain some or all of the components of television receiver 200 and/or may be able to perform some or all of the functions of television receiver 200. Accordingly, instances in this document referring to a STB and steps being performed by a STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be television receiver of FIG. 1 and may be in the form of a STB that communicates with a display device such as a television. Television receiver 200 may be incorporated as part of a television, such as display device 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, catalog database 270, networking information table (NIT) 240, digital video recorder (DVR) database 245, user interface 250, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245 or in a separate file structure by storage medium 225 (e.g., a file may be used to store indications of each type of time). Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle in-coming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a single stream of data from a satellite transponder (or a cable RF channel) at a given time. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, NIT 240, and/or DVR database 245. Recorded television programs may be stored using storage medium 225. Storage medium 225 may be partitioned or otherwise divided such that predefined amounts of storage medium 225 are devoted to storage of omnibus channel files and user-selected television programs.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245 and/or information from EPG database 230) to a television for presentation.

The network information table (NIT) 240 may store information used by television receiver 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by television receiver 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to look up the audio PIDs and video PIDs in another table, such as a program management table (PMT). For example, a program management table (PMT) may store information on audio PIDs and video PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder | ECM PID | PMT PID |
|---------|-----------|-------------|---------|---------|
| 4       | 1         | 2           | 27      | 1001    |
| 5       | 2         | 11          | 29      | 1002    |
| 7       | 2         | 3           | 31      | 1001    |
| 13      | 2         | 4           | 33      | 1004    |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. The same PID may be reused on different transponders.

A Digital Video Recorder (DVR) may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television stations. DVR database 245 or some other storage arrangement (e.g., a separate file) may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to DVR database 245. Using EPG database 230, a user may select a particular television program. Based on the date, time period, and television channel indicated by EPG database 230, Control processor 210-1 may record the associated television program to DVR database 245. Second, DVR database 245 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight. If a television program is selected for recording by a user (e.g., the user sets a recording timer for the television program) and is also specified for recording by the television service provider, the user selection for recording may serve as an indication to save the television program for an extended time (beyond the time which the predefined recording would otherwise be saved).

Whether recording is performed based on a user-selected television program or selection by a television service provider, selection may result in storage by DVR database 245 being managed differently. Separate storage arrangements, such as separate partitions on the same storage device, may be allocated based on which entity designated the television program/channel for recording. As such, DVR database 245 may use multiple storage arrangements, such as multiple partitions on storage medium 225. Television programming recorded based on a television service provider selection may be stored on a first storage arrangement. Television programming recorded based on user selection may be stored on a second storage arrangement. Television programming on the first storage arrangement may automatically be deleted after a predefined period of time, such as two weeks. If a television program stored by the first storage arrangement is selected by a user (such as via a displayed EPG) to be saved, the television program may be transferred from the first storage arrangement to the second storage arrangement, such as when the television programming would otherwise be deleted from the first storage arrangement. Additional detail regarding the recording, storage, and maintenance of television programming by television receiver 200 is provided in conjunction with FIG. 3.

User interface 250 may include a remote control (physically separate from television receiver 200) and/or one or more buttons on television receiver 200 that allows a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on a PID of PMT data. The PID of PMT data packets may be known because it is stored as part of NIT 240. From the PMT data packets, PMT may be constructed by tuning management processor 210-2. Table 2 provides an exemplary extract of a PMT. PMT 257 may be specific to a particular transponder. As such, if tuning to a different transponder occurs, a new PMT may be created for the different transponder.

TABLE 2

| Channel | Video PID | $1^{st}$ Audio PID | $2^{nd}$ Audio PID |
| --- | --- | --- | --- |
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

Catalog database 270 may be used by television receiver 200 to store information about television programs that are stored as part of a channel-specific file and in individual television program files. Catalog database 270 may be updated as television programs are recorded, transferred, and as files corresponding to television programming are deleted. Data stored in catalog database 270 may be used to locate television programs within a channel-specific file. In some embodiments, such data is stored as part of DVR database 245 (as such, catalog database 270 may be incorporated as part of DVR database 245). Additional detail regarding catalog database 270 is provided in relation to embodiment 300 of FIG. 3.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
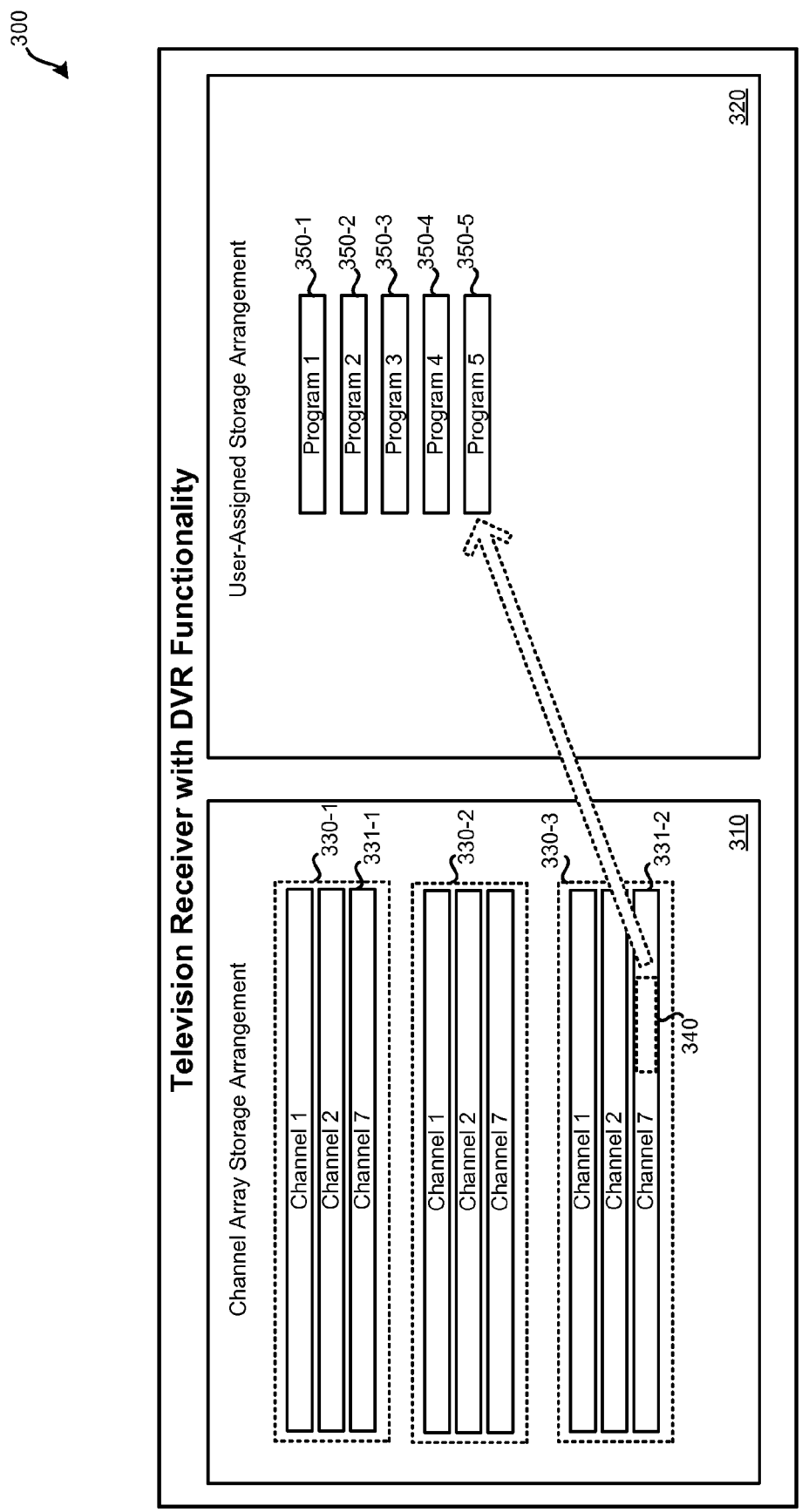
FIG. 3 illustrates an embodiment of a digital video recorder managing multiple storage arrangements.

FIG. 3 illustrates an embodiment 300 of the DVR functionality of television receiver 200 managing multiple storage arrangements of DVR database 245. Television receiver 200 may record television programming to two storage arrangements: channel array storage arrangement 310 and user-assigned storage arrangement 320. These storage arrangements may be separate devices (e.g., separate hard drives or memory) or may be different locations on the same storage device (e.g., separate folders or separate partitions). DVR 300 may be part of a television receiver, such as television receiver 200 of FIG. 2. For example, DVR functionality of television receiver 200 may be performed by control processor 210-1.

Channel array storage arrangement 310 may be used to store recordings of television channels, wherein the recordings each include multiple television programs. The time periods, dates, and television channels which are recorded to channel array storage arrangement 310 may be defined by a television service provider. DVR database 245 may store recorded television channel arrays recorded by television receiver 200 in accordance with rules defined by the television service provider. For instance, a television service provider may define that multiple television channels (e.g., channels 1, 2, and 7 as illustrated in FIG. 3) are to be recorded on each weekday night from 7 PM to 10 PM. A televisions service provider may define the channels, dates, and time periods for which channel arrays are recorded by a television receiver. For each television channel and each time period, a separate file may be created. For example, omnibus channel file 331-1 corresponds to a particular television channel (channel 7) and a particular date. Omnibus channel file array 330-1 represents the three files created for the predefined time period of 7 to 10 PM for preselected television channels 1, 2, and 7. A separate file may be created for each television channel on each day that recording occurs. For example, omnibus channel file array 330-1 (which contains 3 files) may correspond to a first day, while omnibus channel file array 330-2 (which contains three files) may correspond to another day.

Each omnibus channel file of omnibus channel file arrays 330 may contain multiple television programs. The television program is a scheduled production (e.g., movie, documentary, animation, live event, sporting event, sitcom, drama, etc.), which may or may not be episodic. A television program is not a commercial. For example, commercials (or public service announcements) which air during the broadcast of the television program would not be considered separate television programs. Typically, a television program is scheduled for at least 30 minutes. Many television programs appearing during prime time on weekdays are either one hour or 30 minutes in scheduled length. These periods of time may contain time allocated to the scheduled television program and commercials that are to be aired during the scheduled television program.

Multiple television programs may be present within a single omnibus channel file. Omnibus channel file 331-2 was recorded to channel array storage arrangement 310 during a time period and date specified by the television service provider. Within omnibus channel file 331-2, multiple television programs are present. Television program 340 is contained within omnibus channel file 331-2. Within omnibus channel file 331-2, one or more television programs may have been recorded before a television program 340 and after television program 340.

While an omnibus channel file, such as omnibus channel file 331-2, may store audio and video data corresponding to multiple television programs, a separate database may be maintained with program information, such as for locating television programs within an omnibus channel file. A catalog database, such as catalog database 270 of television receiver 200 of FIG. 2, may be maintained. For each recorded television program, an entry may be made in the catalog database. The catalog database may indicate an identifier for a television program and a file in which the television program is stored. If the television program is stored as part of an omnibus channel file, a file offset may be stored within the catalog database for the television program. Table 3 provides an example of several entries which may be present in a catalog database. In some embodiments, a catalog database may store series and episode identifiers for some or all television programs.

TABLE 3

| Television Program Identifier | File Name | File Offset (bytes) | Marked for Save? |
|---|---|---|---|
| 2738239 | es2738239.tsp | 0 | No |
| 9034836 | es2738239.tsp | 9832939 | Yes |
| 4854557 | es1003293.tsp | 10239832 | No |
| 1122092 | es1122092.tsp | 0 | No |

A catalog database may provide data such as that indicated in Table 3. For example, a catalog database may include a television program identifier, a file name of the file in which the television program resides, a file offset (if any), and an indication of whether a user has marked the corresponding television program for saving. A television program identifier may be a unique number that is assigned to a television program at the television receiver. The file name associated with each television program identifier may indicate the file in which the associated television program is stored. This file may be a file specific to the television program or may be a channel-specific file (an omnibus channel file) which contains multiple television programs. As an example, the first two television program identifiers in Table 3 each correspond to the same file name. Accordingly, both of these television program identifiers are associated with television programs present in the same omnibus channel file. In some embodiments, it may be a practice to name each omnibus channel file after the program identifier of the first television program recorded to the omnibus channel file. As such, the filename associated with television program identifier "2738239" contains "2738239". The file offset may be used to determine a location within a file for television programs that contains multiple television programs.

During recording, the file offset may be determined. For the first television program recorded as part of an omnibus channel file, the offset may be zero. For subsequent television programs recorded to the same omnibus channel file, the file offset may be determined by measuring the file size, in bytes, when the television program begins recording. It may be determined when the television program begins recording based on the start time for the television program indicated in an electronic programming guide stored by the television receiver. For example, referring to Table 3, the television program associated with television program identifier 9034836 begins at a file offset of 9832939 bytes. A television program is determined to end at either the end of the file or the next file offset within the same file indicated by the catalog database. For example the television program associated with television program identifier "2738239" ends at a file offset of 9832938 bytes (based on the file offset associated with television program identifier "9034836").

Each omnibus channel file stored by channel array storage arrangement 310 may be deleted on a scheduled basis. For example, two weeks after an omnibus channel file is recorded, the omnibus channel file may be deleted. By automatically deleting omnibus channel files after a period of time, the total amount of storage space necessary for channel array storage arrangement 310 may be determined accurately. For example, if it is known when omnibus channel files will be deleted, and it is known how many and for how long omnibus channel files will be recorded, a necessary amount of storage space may be allocated to channel array storage arrangement 310.

During the period of time in which omnibus channel files are stored by channel array storage arrangement 310, a user may have the ability to watch any of the television programs stored within omnibus channel files. Following the period of time during which the omnibus channel files are stored, only individual television programs specifically indicated by a user to be designated for saving may be preserved; other television programs that are part of the omnibus channel file may be deleted. Referring to omnibus channel file 331-2, the user may select television program 340 for preservation. This may result in a flag (which may be a single bit) being set within the catalog database that indicates the television program is to be saved when the omnibus channel file is deleted. As an example of a reason why a user may choose to preserve television program 340, television program 340 may be part of a series which the user enjoys watching but the user did not have a chance to view while television program 340 was stored by channel array storage arrangement 310. The user may designate television program 340 for saving via an EPG interface of television receiver 200. The user may have marked the specific episode corresponding to television program 340 for saving or may have selected the entire series of which television program 340 is an episode for saving.

When omnibus channel file array 330-3 is to be deleted, television program 340 may be transferred from channel array storage arrangement 310 to user-assigned storage arrangement 320. The dotted arrow of FIG. 3 is intended to illustrate how television program 340 becomes an individual television program file 350-5 on user-assigned storage arrangement 320. User-assigned storage arrangement 320 may be a separate storage arrangement, such as a separate partition of the storage device, on which the user is permitted to allocate storage space as desired. As such, the television programs stored by user-assigned storage arrangement 320 may be determined by a user. For example, a user may be permitted to store as many television programs to user-assigned storage arrangement 320 as desired until user-assigned storage arrangement 320 is full. Once full, the user may be required to delete one or more television programs from user-assigned storage arrangement 320 before storing another television program to user-assigned storage arrangement 320.

When a television program is transferred to user-assigned storage arrangement 320, the catalog database may need to be updated such that the television program can be located. Entries corresponding to the deleted omnibus channel files may be deleted from the catalog database. The new entry for the television program transferred to user-assigned storage arrangement 320 may be made (or the previous entry for the television program may be modified). Table 4 illustrates an example of a modified portion of a catalog database for television program 340 after being transferred to the user-assigned storage arrangement 320.

TABLE 4

| Television Program Identifier | File Name | File Offset (bytes) | Marked for Save? |
|---|---|---|---|
| ~~2738239~~ | ~~es2738239.tsp~~ | ~~0~~ | ~~No~~ |
| 9034836 | es9034836.tsp | 0 | Yes |

TABLE 4-continued

| Television Program Identifier | File Name | File Offset (bytes) | Marked for Save? |
|---|---|---|---|
| ~~4854557~~ | ~~es1003293.tsp~~ | ~~10239832~~ | ~~No~~ |
| ~~1122092~~ | ~~es1122092.tsp~~ | ~~0~~ | ~~No~~ |

In Table 4, assume television program identifier 9034836 corresponds to television program 340. The entries associated with television program identifier "2738239", "4854557", and "1122092" are deleted due to deletion of the corresponding omnibus channel files from channel array storage arrangement 310 (such deletions are indicated by strikethrough text). However, the entry corresponding to television program 340 is maintained with the filename and file offset being updated for the television program-specific file in which the television program is now stored. As such, as omnibus channel files are created, stored, and deleted and as individual television program files are created, stored and deleted, a catalog database may be updated such that each television program has an entry (that is, television programs stored in omnibus channel files and television programs stored in individual program files each have entries).

Once a copy of television program 340 has been transferred to a user-assigned storage arrangement 320, omnibus channel file 331-2 may be deleted. However, a individual television program file 350-5 may be created and stored on user-assigned storage arrangement 320. For example purposes only, four other television programs are illustrated as stored by user-assigned storage arrangement 320. Each of individual television program files 350 is associated with separate files. As such, each television program-specific file of individual television program files 350 are intended to store a single television program from start to finish. It should be understood that due to recording scheduling, a short period of time of another television program (and/or commercials) may be stored at the beginning and/or end of a television program specific file. Likewise, a short period of time of the television program desired to be recorded may fail to be recorded at the beginning or end of the recording of the television program. While channel array storage arrangement 310 stores channel-specific files, user-assigned storage arrangement 320 stores television program-specific files. Once a television program, such as individual television program file 350-5, is stored on user-assigned storage arrangement 320, the television program may be stored indefinitely until the television program is selected for deletion by a user.

While the embodiment 300 of FIG. 3 focuses on the recording, storage, and deletion of omnibus channel files and program specific files (which contain audio and video data), it should be understood that other files may accompany the audio and video data, such as to store metadata associated with each television program. Such files, referred to as bookmark files, may be created, stored, and deleted as detailed in reference to FIGS. 4 and 5.

Embodiment 300 may represent a situation where the television receiver is enabled to record arrays of television channels (such as on a nightly basis). It should be understood that a user may disable such recording. If disabled, a user may still select individual television programs for recording. Such individual television programs selected for recording may be recorded directly to user-assigned storage arrangement 320 into individual television program files. In some embodiments, if a user has disabled television channel array recording, the storage arrangement devoted to array storage may be reassigned and used for other storage, such as for storage of additional user selected television programs. In some embodiments, when array recording is disabled the channel array storage arrangement may be removed (if a partition) with the space reallocated to the user-assigned storage arrangement or some other storage arrangement. Alternatively, the channel array storage arrangement may remain unused.

Figure 4:
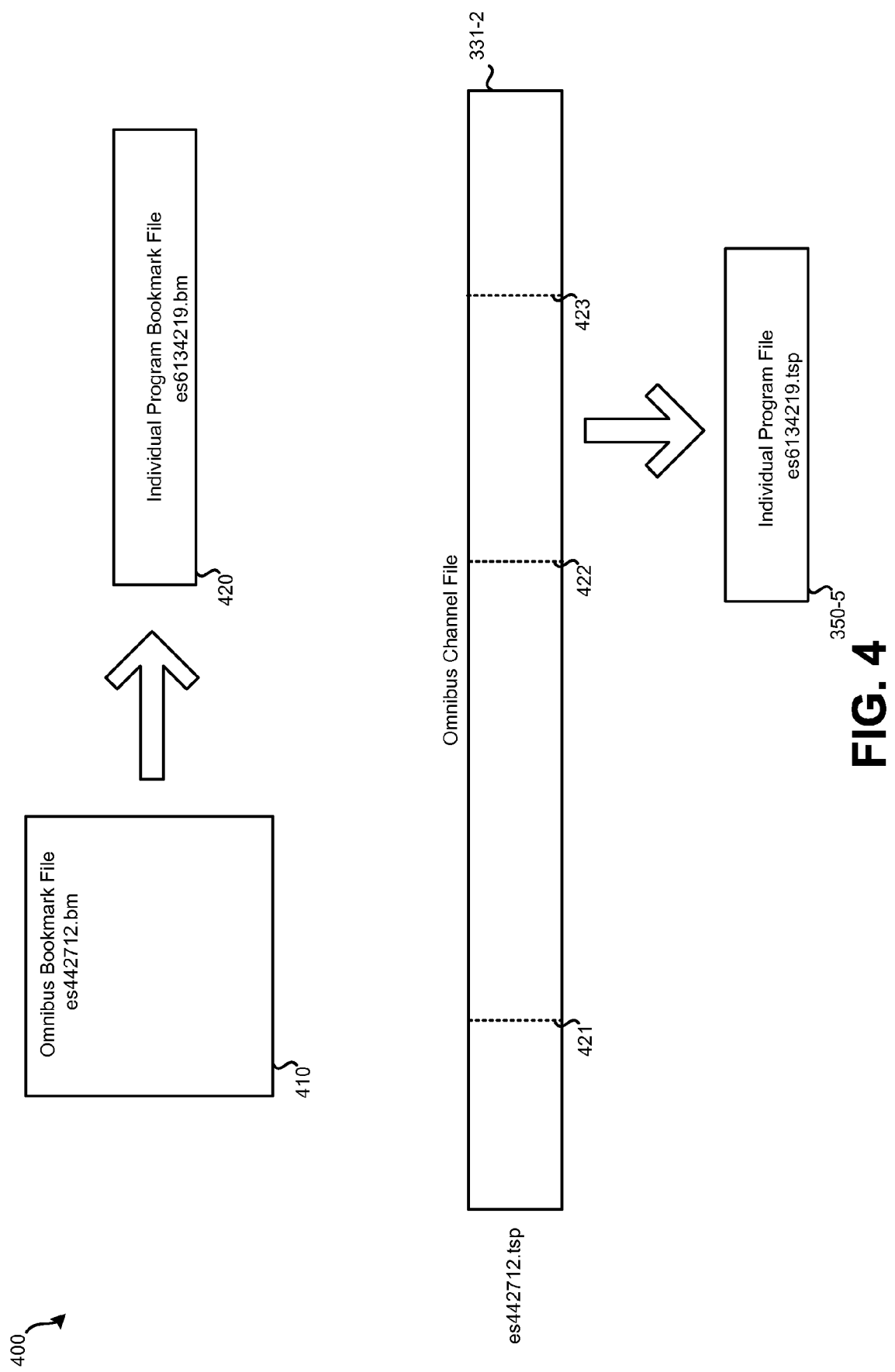
FIG. 4 illustrates an embodiment of a graphical representation of extraction of a television program from an omnibus channel file.

FIG. 4 illustrates an embodiment 400 of a graphical representation of extraction of a television program from an omnibus channel file. Embodiment 400 may represent the arrangement of embodiment 300 where television program 340 is transferred to user-assigned storage arrangement 320 and stored as individual television program file 350-5. In FIG. 4, two transfers are represented: transfer of video and audio data from an omnibus channel file to a television program-specific file; and transfer of metadata from an omnibus bookmark file to an individual program-specific bookmark file.

During or following an omnibus channel file being recorded and stored, a corresponding omnibus bookmark file may also be created and stored. For example, omnibus channel file 331-1 of FIG. 4 represents a television channel omnibus file recorded as part of omnibus channel file array 330-3 of FIG. 3. When omnibus channel file 331-2 is recorded, omnibus bookmark file 410 may be created. Omnibus bookmark file 410 may be used to store metadata, such as information about the television programs present within omnibus channel file 331-2. For example, information typically presented to a user in an electronic programming guide for each television program within omnibus channel file 331-2 may be stored as part of omnibus bookmark file 410. For example, omnibus bookmark file 410 may include for each television program present within omnibus channel file 331-2: a television program title, a television program episode name, a series identifier, an episode identifier, a description of the television program, audio and video PID information, a broadcast date/time/channel, a start time (indicated by a file offset, and/or an end time (indicated by another file offset).

While omnibus channel file 331-2 is being created, omnibus bookmark file 410 may be created based on information present in the locally-stored electronic programming guide and event transitions occurring. An event transition may occur when a new television program is scheduled to begin according to the EPG. For example, an event transition may occur at 8 PM due to the EPG indicating a new television program is scheduled to begin at 8 PM on the television channel being recorded to the omnibus channel file. It should be understood that the actual start time of the television program as broadcast by the television channel may vary; likely, the difference in time between the event transition and the actual start time of the television program is at most a few minutes.

When an event transition occurs on the television channel being recorded to omnibus channel file 331-2, a new entry may be made in omnibus bookmark file 410 based on the file offset of the omnibus channel file 331-2. The file offset may be measured by determining the file size of omnibus channel file 331-2 when the event transition occurs. At a later time, based on the file offset, it may be possible to determine where in omnibus channel file 331-2 the television program is scheduled to begin (according to the EPG data). Omnibus bookmark files may be named in accordance with omnibus channel files. For example, the name of omnibus bookmark file 410 may match omnibus channel file 331-2, with only a different file extension (e.g., .bm). As such, based on knowing the file name of omnibus channel file 331-2, a television receiver may access the corresponding omnibus bookmark file by changing the file extension of the omnibus channel file.

Just as after a predefined period of time omnibus channel file 331-2 is scheduled to be deleted, omnibus bookmark file 410 may also be deleted. As such, when an omnibus channel file is deleted, an associated omnibus bookmark file may also be deleted. If the user has marked a portion of omnibus channel file 331-2 for saving, the corresponding portion of omnibus bookmark file 410 may also be preserved such that the metadata associated with the television program selected by the user is preserved.

Within omnibus channel file 331-2, three event transitions occur: event transition 421, event transition 422, and event transition 423. Each of these event transitions may be determined based on event transitions present within the electronic programming guide of the television receiver. Event transitions 421, 422, and 423 are indicated by file offsets stored by omnibus bookmark file 410. Therefore, based on the file offsets, which may be measured in bytes (or some other measurement arrangement, such as playback time), it may be possible for a television receiver to locate event transitions 421, 422, and 423. While event transitions are illustrated as present in omnibus channel file 331-1 for visualization purposes, it should be understood that no metadata that indicates the event transition may actually be present in omnibus channel file 331-2.

Based on a user having selected the television program indicated as beginning at event transition 422 and ending at event transition 423, an individual program file may be created for the corresponding television program when omnibus channel file 331-2 is to be deleted. In some embodiments, rather than waiting for when omnibus channel file 331-2 is to be deleted, the individual program file may be created for the television program when the selection for saving the television program is received from the user. Based upon the file offsets associated with event transition 422 and 423 stored in catalog database 270, DVR database 245, or omnibus bookmark file 410, individual television program file 350-5 may be created. Referring to embodiment 300 of FIG. 3, it should be understood that omnibus channel file 331-2 may be stored on channel array storage arrangement 310, while individual television program file 350-5 is stored using user-assigned storage arrangement 320. In some embodiments, a single storage arrangement is used for both omnibus channel files and individual program files.

As previously detailed, a catalog database maintained by the television receiver may indicate filenames and file offsets for where particular television programs begin and end within omnibus channel files. Based on these filenames and file offsets, the appropriate portion of omnibus channel file 331-2 may be extracted to create individual television program file 350-5. Further, the filename may be used to determine the corresponding omnibus bookmark file 410 and the file offset may be used to locate the appropriate metadata within omnibus bookmark file 410 to preserve. Metadata associated with the offset indicated in the catalog database may be used to create a television program-specific bookmark file. Such an individual program bookmark file 420 may contain metadata associated with only a particular television program. As an example, individual program bookmark file 420 may contain metadata only associated with individual television program file 350-5. For the one television program, such metadata may include: a television program title, a television program episode name, a series identifier, an episode identifier, a description of the television program, audio and video PID information, and/or a broadcast date/time/channel. While only a single television program is present within individual television program file 350-5, it may still be necessary to store data related to the audio and video PIDs of the television program. For instance, multiple audio PIDs may be present for a second audio program (SAP). Further, in some embodiments, decoding hardware, such as audio/video decoder 233 of FIG. 2, may require the audio and video PID be specified, regardless of whether only a single audio and a single video stream are present within a file for decoding and output to a presentation device, such as a television.

Based on the user selecting a particular television program from within the omnibus channel file for saving, an individual program file in an individual program bookmark file for the television program is created and stored to a separate storage arrangement. The omnibus bookmark file and the omnibus channel file may then be deleted. It should be understood that while the previous described embodiments are directed to a single television program from an omnibus channel file being saved, more than one television program from a single omnibus channel file may be saved to a user-assigned storage arrangement for later viewing.

In embodiment 400, data for omnibus bookmark file 410 is created based on data from the electronic programming guide of the television receiver. The data for the electronic programming guide may have been received by the television receiver at some point ahead of when the television program was broadcast on the television channel. As such, the event transitions used to indicate the file offsets within omnibus bookmark file 410 may only be estimates. Due to delays, scheduling conflicts, commercials, etc., the actual start and stop time of a television program may vary from the event transitions indicated in the EPG, which is used to determine the file offsets stored to omnibus bookmark file 410. Therefore, if the file offsets indicated in omnibus bookmark file 410 are used to determine the start and end times of a first television program, a portion of the first television program may be lost at the beginning (or end) and/or a portion of a second television program (or commercials) may be present at the beginning (or end) of the recording of the first television program.

Figure 5:
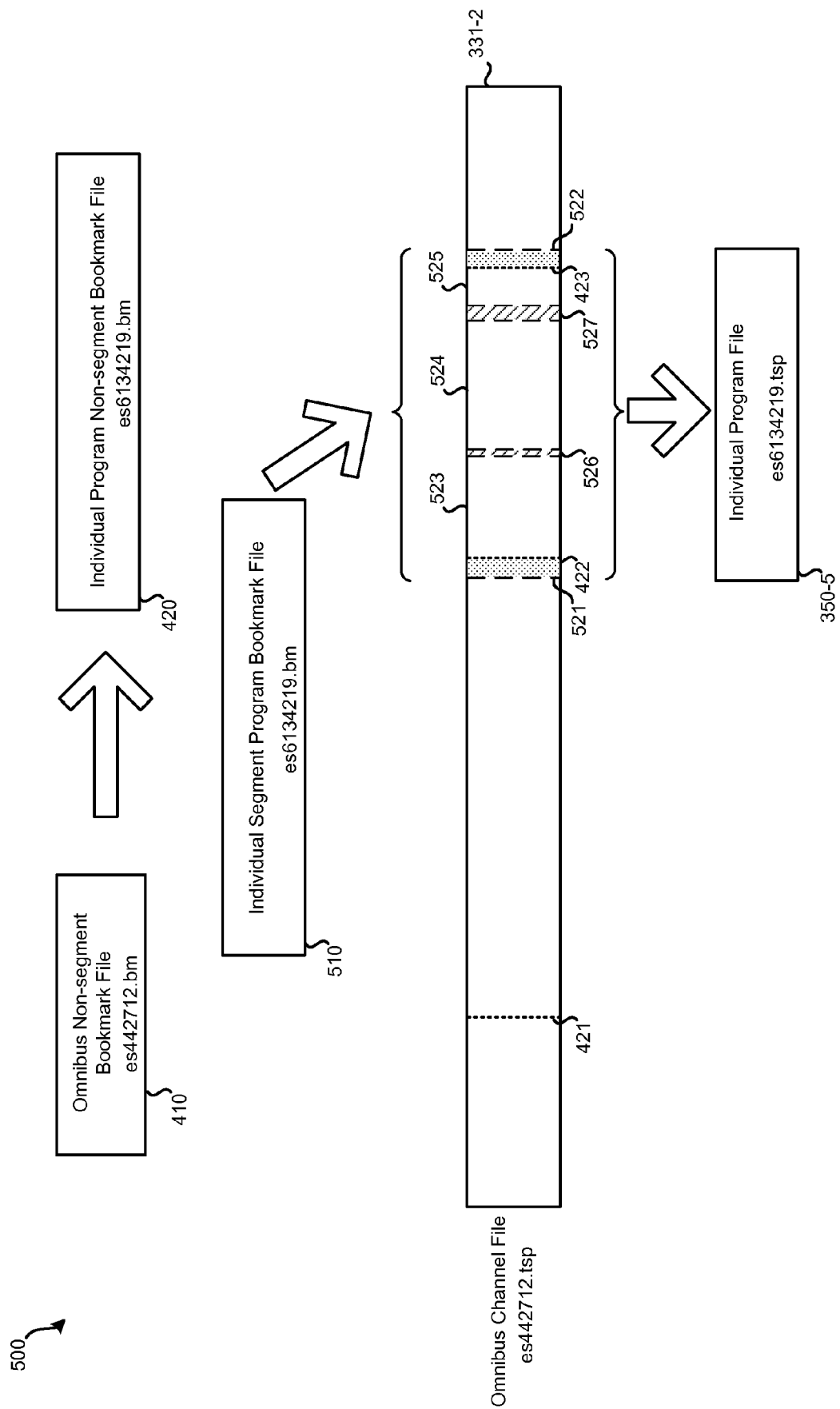
FIG. 5 illustrates another embodiment of a graphical representation of extraction of a television program from an omnibus channel file.

FIG. 5 illustrates an embodiment 500 of a graphical representation of extraction of a television program from an omnibus channel file. Embodiment 500 may represent the arrangement of embodiment 300 where television program 340 is transferred to user-assigned storage arrangement 320 and stored as individual television program file 350-5. In embodiment 400, omnibus bookmark file 410 was created, stored, and later used to create individual program bookmark file 420. In embodiment 500, a supplemental bookmark file, referred to as a segmented bookmark file for a specific television program may be created to supplement the omnibus bookmark file created based on EPG information. For clarity, an omnibus bookmark file (such as omnibus bookmark file 410 of FIG. 4) created for multiple television programs recorded consecutively on a television channel may be referred to as a non-segmented omnibus bookmark file. This non-segmented bookmark file contains metadata based on the received and locally-stored electronic programming guide information, which is received ahead of the broadcast of the contained television programs. A segmented bookmark file may be created using information collected by the television service provider and may indicate a more accurate television program start time and television program end time for a particular television program. Additionally or alternatively, a segmented bookmark file may designate portions of a recording of a television program directed to content a user is unlikely to want to watch (such as commercials). Data for creating a segmented bookmark file for a television program may involve having one or more persons watch the television program at a facility of the television service provider and provide input to a television service provider system that indicates 1) at what time a television program actually begins and ends and/or 2) during what time periods commercial breaks during the television program begin and end. Series and episode identifiers may be used to identify the television program.

Similar to as detailed in relation to FIG. 4, omnibus channel file 331-2 may be recorded on a particular television channel over a period of time during which multiple television programs are broadcast. As such, omnibus channel file 331-2 may contain multiple television programs. During or following omnibus channel file 331-2 being recorded and stored, a corresponding non-segmented omnibus bookmark file may also be created and stored. Omnibus channel file 331-2 of FIG. 5 represents an exemplary television channel omnibus file recorded as part of omnibus channel file array 330-3 of FIG. 3. When omnibus channel file 331-2 is recorded, non-segmented omnibus bookmark file 410 may be created and stored. This non-segmented omnibus bookmark file 410 represents the same omnibus bookmark file 410 of embodiment 400 of FIG. 4 and may contain the same information. Non-segmented omnibus bookmark file 410 may be used to store metadata, such as information about the television programs present within omnibus channel file 331-2. Non-segmented omnibus bookmark file 410 may be created using information corresponding to the television channel and the date/time present in the locally-stored EPG of the television receiver. For example, non-segmented omnibus bookmark file 410 may include for each television program present within omnibus channel file 331-2: a television program title, a television program episode name, a series identifier, an episode identifier, a description of the television program, audio and video PID information, a broadcast date/time/channel, a start time (indicated by a file offset, and/or an end time (indicated by another file offset). This information may be received ahead of when the television program is scheduled to be broadcast (e.g., several days ahead of time). As such, a start and an end time for the television program may be estimated.

While omnibus channel file 331-2 is being created, non-segmented omnibus bookmark file 410 may be created based on information present in the locally-stored EPG and event transitions (as indicated by the EPG) occurring. An event transition may occur when a new television program is scheduled to begin (as indicated by the EPG data). For example, an event transition may occur at 8 PM due to the EPG indicating a new television program is scheduled to begin at 8 PM on the television channel being recorded. It should be understood that the actual start time of the television program as broadcast by the television channel may vary; likely, the difference in time between the event transition and the actual start time of the television program is at most a few minutes.

When an event transition occurs (according to the EPG) on the television channel being recorded to omnibus channel file 331-2, a new entry may be made in non-segmented omnibus bookmark file 410 based on a measured file size of omnibus channel file 331-2. The file size may be stored as a file offset that indicates the point at which the television program is scheduled to begin in omnibus channel file 331-2. The file size may be measured by determining the file size of omnibus channel file 331-2 when the event transition occurs. At a later time, based on the stored file offset, it may be possible to determine where in omnibus channel file 331-2 the television program is scheduled to begin (according to the EPG). Non-segmented omnibus bookmark files may be named in accordance with omnibus channel files. For example, the name of non-segmented omnibus bookmark file 410 may match omnibus channel file 331-2, with a different file extension. As such, based on knowing the file name of omnibus channel file 331-2, a television receiver may access the corresponding omnibus bookmark file by using the same file name with a different file extension.

As previously mentioned, the start and end times of television programs may not be accurate based on EPG data. As such, during, or at some point after omnibus channel file 331-2 is created and stored (and non-segmented omnibus bookmark file 410 is created and stored), the television receiver may receive segment data from a television service provider. The segment data may be used to create a segmented bookmark file 510 for a particular television program. In some embodiments, the segmented bookmark file 510 may be created several hours, a day, or several days after creation and storage of omnibus channel file 331-2 and non-segmented omnibus bookmark file 410. The segmented bookmark file 510 may correspond to a particular television program; as such, if multiple television programs are present in omnibus channel file 331-2, a separate segmented bookmark file may be created for each television program based on received segment data. In many embodiments, a segmented bookmark file will be created after the non-segmented omnibus bookmark file is created, but before the associated omnibus channel file is selected for deletion (which is likely to occur a week or more after creation). A segmented bookmark file may be intended to supplement the information stored in a corresponding non-segmented omnibus bookmark file for a particular television program. Segmented bookmark files associated with television programs stored as part of an omnibus channel file may be stored to the same storage arrangement as the omnibus channel file.

Data used to create segmented bookmark files may be transferred to the television receiver. Referring to FIG. 1, such data may be relayed by television service provider system 110 to the television receiver 150 via a transponder stream using one of satellites 130. The data for segmented bookmark file 510 may indicate a more accurate start time and/or end time for a particular television program recorded as part of omnibus channel file 331-2. Additionally, the data for segmented bookmark file 510 may indicate periods of time corresponding to commercial breaks occurring during a television program recorded as part of omnibus channel file 331-2. The television receiver may determine the television program to which the segmented data corresponds based on a series identifier and an episode identifier which are transmitted to the television receiver by the television service provider and may be stored in the form of an announcement file. The series and episode identifiers may be used to match the segment data to a locally-created program identifier, which is stored in a catalog database. Accordingly, by using the series and episode identifier, a television receiver can determine the correct program to which segment data corresponds. Following the program identifier being determined, a segment bookmark file may be created for the television program using the received segment data and linked with the program identifier.

From received segment data, segmented bookmark file 510 may be created which corresponds to, for example, television program 340 of FIG. 3, which has been selected by a user for saving. A non-segmented omnibus bookmark file 410 and a segmented bookmark file 510 may be maintained separately. While omnibus channel file 331-2 is in existence and the user has selected a television program present in omnibus channel file 331-2 for playback, segmented bookmark file 510 may be used to determine at what points within omnibus channel file 331-2 playback should begin and end for television program 340. The playback start point may be before, after, or at the start event transition point indicated by the EPG. Similarly, the playback endpoint may be before, after, or at the end event transition indicated by the EPG. As such, the start and end times indicated by the segmented bookmark file for a television program can be expected to be more accurate than start and end times indicated by file offsets in a non-segmented bookmark file, such as non-segmented omnibus bookmark file 410.

In embodiment 500, according to the television receiver's EPG data, event transition 422 signals the beginning of television program 340 and event transition 423 signals the end of television program 340. These event transitions may be stored as file offsets in non-segmented omnibus bookmark file 410. Based on segment data later received by the television receiver, segmented bookmark file 510 may contain more accurate start and end times for television program 340. In the illustrated embodiment, event transition 521 signals the beginning of television program 340 and event transition 522 signals the end of television program 340. Accordingly, television program 340 began early and ended late (as compared to the previously-stored EPG information at the television receiver). It should be understood that in other embodiments, a television program may start late and/or end early, or some other combination thereof. It is, of course, possible that a television program may begin and/or end exactly as scheduled in the EPG.

Segmented bookmark file 510 may be used to skip commercials (or some other undesired viewing event) during viewing of the television program. Segments of a television program may be defined based on portions of the television programming the user is likely to want to watch. For example commercial portion 526 and commercial portion 527 of omnibus channel file 331-2 may correspond to commercial breaks, and thus may be desired to be skipped during viewing by a user. Segment 523, which begins at event transition 521 and ends at the beginning of commercial portion 526; segment 524, which begins at the end of commercial portion 526 and ends at the beginning of commercial portion 527; and segment 525, which begins at the end of commercial portion 527 and ends at event transition 522, may be segments desired to be watched by user. A segment may be defined by a positive and negative frame offset from a frame within the segment. The frame from which the positive and negative frame offsets are measured may be identified based on a string of characters appearing in the closed captioning data. Accordingly, the segment data received by the television receiver from the television service provider may indicate a string of characters to be located within closed captioning data of the television program, a positive frame offset (which defines the end of the segment) and the negative frame offset (which defines the beginning of the segment). Segments may be defined such that commercials are excluded. Thus, during playback, the user can seamlessly or almost seamlessly watch the television program without undesired viewing events, such as interspersed commercials.

Referring to FIG. 3, based on a user having selected television program 340, an individual television program file 350-5 may be created for the corresponding television program when omnibus channel file 331-2 is to be deleted. In some embodiments, rather than waiting for when omnibus channel file 331-2 is to be deleted, the individual program file may be created for the television program when the selection for saving the television program is received from the user. Referring back to FIG. 5, if a segmented bookmark file associated with the television program is stored by the television receiver, as it is in embodiment 500, the segmented bookmark file may be used to determine a start and end time for the individual program file. Based upon the start and end times indicated in segmented bookmark file 510, individual program file 530 may be created. Referring to embodiment 300 of FIG. 3, it should be understood that omnibus channel file 331-2 may be stored on channel array storage arrangement 310, while individual program file 530 is stored using user-assigned storage arrangement 320. In some embodiments, a single storage arrangement is used for both omnibus channel files and individual program files.

As previously detailed, a catalog database of the television receiver may indicate filenames and file offsets at which particular television programs begin and end within omnibus channel files. Based on these filenames, file offsets and corresponding data in segmented bookmark file 510 (which may be named according to the program identifier assigned at the television receiver), the appropriate portion of omnibus channel file 331-2 may be extracted to create individual program file 530. Further, the filename may be used to determine the corresponding non-segmented omnibus bookmark file 410 and the file offset may be used to locate the appropriate metadata within non-segmented omnibus bookmark file 410 which is to be preserved. Metadata associated with the offset indicated in the catalog database may be used to create an individual program non-segmented bookmark file 420. Such an individual program non-segmented bookmark file 420 may contain metadata associated with only the particular television program. As an example, individual program bookmark file 420 may contain metadata only associated with individual television program file 350-5. For the one television program, such metadata may include: a television program title, a television program episode name, a series identifier, an episode identifier, a description of the television program, audio and video PID information, and/or a broadcast date/time/channel. Data from segmented bookmark file 510 may be used to determine the start and end points at which the television program occurs within omnibus channel file 331-2. Based on this data from the segmented bookmark file, the start and end points used to create individual program file 530 may be determined.

The segmented bookmark file 510 may be preserved and stored on the same storage arrangement with individual television program file 350-5 and individual program non-segmented bookmark file 420. Segment data of segmented bookmark file 510 may be used during playback to skip undesirable viewing events, such as commercial breaks. Accordingly, for a television program selected by a user to be stored to a user-assigned storage arrangement, three files may be stored: an individual program file (which may contain audio and video data); a non-segmented program-specific bookmark file (which may contain metadata, such as a description of the television program); and a segmented bookmark file (which may contain metadata indicating segments of the individual program file that are to be played during playback).

Based on the user selecting a particular television program from within the omnibus channel file for saving, an individual program file and an individual program non-segmented program bookmark file are created and stored. The corresponding segmented bookmark file for the television program is preserved. Each file may be stored to a user-assigned storage arrangement. The non-segmented omnibus bookmark file and the omnibus channel file may then be deleted according to the predefined schedule. It should be understood that while the previous described embodiments are directed to a single television program from an omnibus channel file being saved, more than one television program from a single omnibus channel file may be saved to a user-assigned storage arrangement for later viewing.

Figure 6:
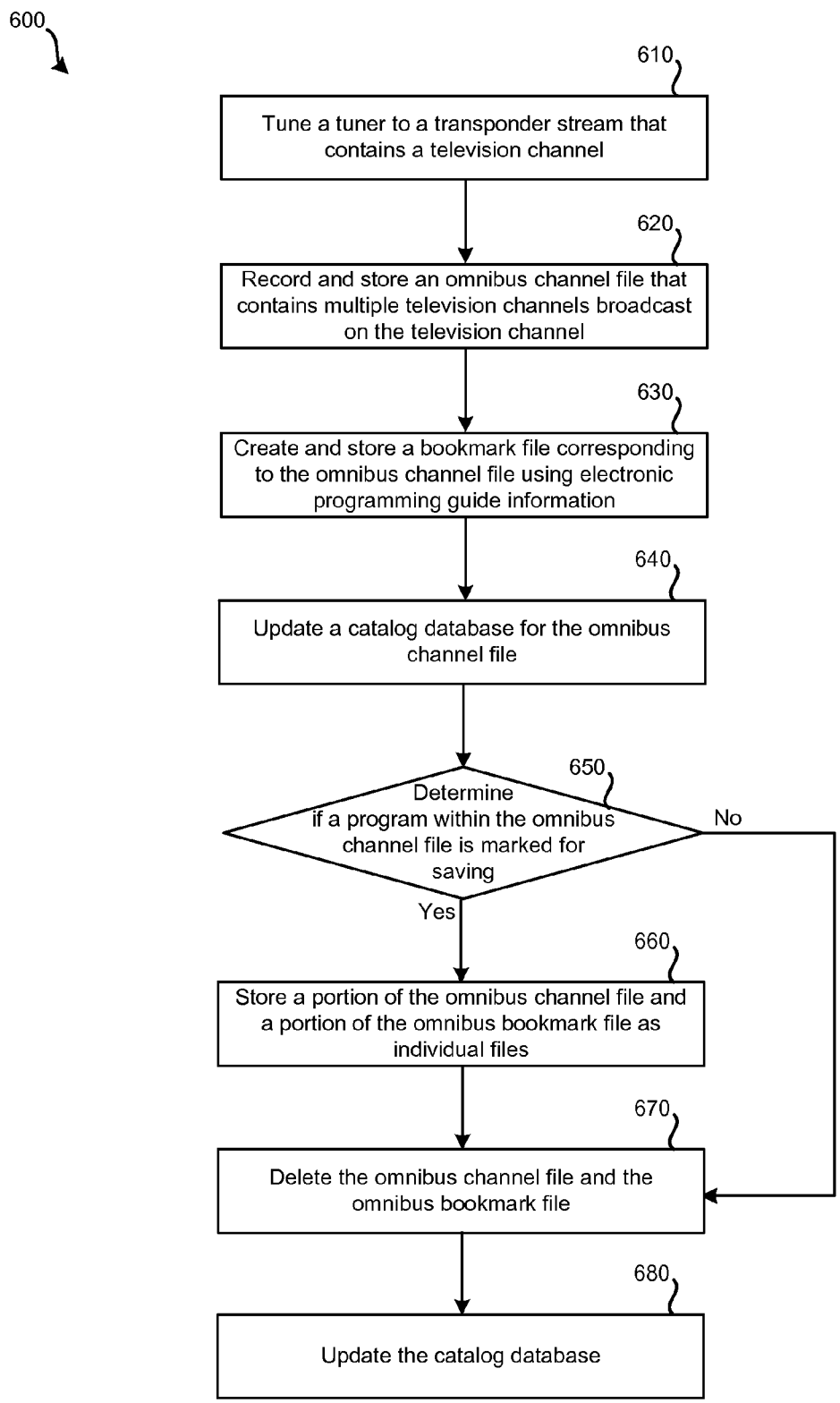
FIG. 6 illustrates an embodiment of a method for extracting a television program from an omnibus channel file.

Using a television distribution system (such as satellite television distribution system 100 of FIG. 1) and a television receiver (such as television receiver 200 of FIG. 2), various methods may be performed. FIG. 6 illustrates an embodiment of a method 600 for extracting a television program from an omnibus channel file and saving it to an individual program file. Method 600 may be performed using a television receiver, such as a set top box. Method 600 may involve data being received from a television service provider, such as via satellite television distribution system 100 of FIG. 1. It should be understood that in other embodiments of method 600, other forms of provider systems may be used, such as cable television distribution systems or an IP television distribution system. Means for performing method 600 include television receivers, television service provider systems, and computer systems (which may be incorporated as part of a television receiver and/or television service provider system).

At step 610, a tuner of the television receiver may be tuned to a transponder stream that contains a television channel to be recorded. In some embodiments, multiple television channels may be recorded at the same time. Further, in some embodiments, the multiple television channels may be received via a single tuner of the television receiver. As an example, four television channels may be recorded simultaneously (such as during primetime), wherein each of the television channels is received by the television receiver using a single tuner.

At step 620, and omnibus channel file may be recorded and stored for the television channel tuned to at step 610. The omnibus channel file recorded and stored may contain multiple television programs which were broadcast on the television channel within the time period during which recording occurred. As an example, if the omnibus channel file was recorded for a television channel from 7 PM until 10 PM, the single omnibus channel file would contain each television program broadcast on the television channel during the time period from 7 PM until 10 PM. If each television program broadcast during this time period was thirty minutes long, six television programs may be stored as part of the single omnibus channel file. The recording of the omnibus channel file may be stored to storage arrangement, such as a hard drive partition, dedicated to storage of such omnibus channel files. Multiple omnibus channel files, for different channels, may be recorded and stored simultaneously. For instance, omnibus channel files may be stored for each major television network during a period of time, such as prime time. The television channels, the dates, and the time periods for which omnibus channel files are created may be selected by the television service provider. The television service provider may configure the television receiver such that the recording of the omnibus channel files occurs according to the schedule selected by the television service provider.

At step 630, a bookmark file corresponding to the omnibus channel file may be created and stored. Because this bookmark file contains information on each television program present within the omnibus channel file, the bookmark file may be referred to as a (non-segmented) omnibus bookmark file. The omnibus bookmark file may be created based on information present within an electronic programming guide (EPG) stored by the television receiver. According to EPG data, when an event transition occurs (one television program ending and another beginning) for the television channel being recorded, an entry may be made in the omnibus bookmark file that indicates a file offset, a program identifier (which may be created by the television receiver), and information about television program (e.g., title, description, series name, rating). The file offset may be based on the file size of the omnibus channel file (e.g., measured in bytes) at the (approximate) time of the event transition. The omnibus bookmark file may be named to match the omnibus channel file, with a different file extension (such as .bm).

In response to each event transition, an entry may be made within a catalog database maintained by the television receiver at step 640. The entry in the catalog database may indicate at least: the program identifier, a file name of the omnibus channel file (which may be named after the program identifier of the first television program recorded as part of the omnibus channel file), and the file offset. Therefore, based on the entry in the catalog database, information about the television program (via the bookmark file) and the location of the television program (via the filename of the omnibus channel file and the file offset) may be determined. In some embodiments, rather than an entry in the catalog database being made in response to each event transition, entries may be made for each program recorded as part of the omnibus channel file following the recording of the omnibus channel file being completed.

Once recording of the omnibus channel file is complete, the omnibus channel file may be stored for a predetermined amount of time, such as two weeks. This predetermined time may be set by the television service provider (or, possibly, a user of the television receiver). During this time period, the user may be permitted to individually view some or all of the television programs that were recorded as part of the omnibus channel file. Just as with other television programs recorded using a DVR feature of the television receiver, a user may be permitted to select a particular television program for playback. Prior to, during, or after the omnibus channel file having been recorded, a user may indicate one or more television programs within the omnibus channel file are to be saved. By indicating a particular television program is to be saved, the television program may not be subject to be stored for only the predetermined amount of time. Therefore, by selecting a television program for saving, the television program may be available to the user for playback until the user specifies the television program is to be deleted. If a television program of the omnibus channel file is to be saved, a user input indicating that a television program of the omnibus channel file is to be saved may be received by the television receiver. For example, via the EPG of the television receiver, a user may select a television program for saving. An indication of the user input may be stored as a flag in the catalog database. Each entry within the catalog database corresponding to a television program of an omnibus channel file may have a flag bit (or some other form of indicator) that indicates whether the television program associated with the entry in the catalog database is to be saved or not. Accordingly, in response to user input indicating the television program is to be saved, the entry corresponding to the television program may be updated to reflect the saving designation in the catalog database.

Step 650 may be performed when the predetermined amount of time for which the omnibus channel file is to be saved has elapsed. For example, step 650 may be performed approximately two weeks after the omnibus channel file is recorded and stored at step 620 (other periods of time are also possible). At step 650, a determination may be made as to whether one or more of the television programs present within the omnibus channel file are to be saved. Determining whether one or more television programs present within the omnibus channel file are to be saved may include analyzing the catalog database stored by the television receiver. For each entry of the television program that is stored within the omnibus channel file, a field within the catalog database may be examined. This field may be a single bit that indicates whether or not the television program is to be saved.

If at step 650 it is determined that no television programs within the omnibus channel file were marked for saving, method 600 may proceed to step 670. At step 670, the omnibus channel file and the omnibus bookmark file may be deleted, such that the television programs stored within the omnibus channel file are no longer available. At step 680, the catalog database may be updated such that entries are no longer present for the television programs which are stored as part of the omnibus channel file.

Returning to step 650, if one or more television programs within the omnibus channel file were marked for saving, method 600 may proceed to step 660. For the remainder of method 600, it is assumed that a single television program of the omnibus channel file was selected for saving and was so indicated in the catalog database. It should be understood that in other embodiments more than one television programs from within the omnibus channel file may be marked for saving.

In some embodiments, a user may have the ability to select that channel arrays are to no longer be recorded and/or stored. A user providing such an input to the television receiver may trigger step 650 to be performed for some or all television programs within omnibus channel files stored by the television receiver.

At step 660, the portion of the omnibus channel file corresponding to the television program may be copied or moved to an individual program file. The individual program file may be stored to a separate storage arrangement, such as a separate storage device, a separate partition of a hard drive, or a separate folder on the same drive. As such, individual program files may be stored to a separate storage arrangement from omnibus channel files. Accordingly, this may mean that storage to a first partition is managed by the television service provider while storage to a second partition is based on user selection of television programs for storage. The portion of the omnibus channel file stored may be based on the file offsets stored in the bookmark file created at step 630 and/or the file offsets stored in the catalog database. Using these file offsets, which may be obtained from either the bookmark file or the catalog database, a start point and endpoint for the television program within the omnibus channel file may be determined. It should be understood that this start point and endpoint for the television program may be based on EPG data, which was received by the television receiver before the television program was broadcast. As such, the start and end times may be approximate and may not match with the actual start and end point of the television program as broadcast on the television channel. Accordingly, the individual program file may begin before or after the start of the television program; likewise, the end of the individual program file may be before the end of the television program or after the end of the television program.

Further, at step 660, from the omnibus bookmark file, an individual bookmark file may be created for the television program. The individual bookmark file may also be stored to a different storage arrangement along with the individual program file. The individual bookmark file may contain only metadata that corresponds to the particular television program. Based on the file offset of the television program to be saved, the metadata to be saved for the television program may be identified from within the omnibus bookmark file. As such, following step 660, an individual program file and an individual bookmark file may be created for the television program selected by the user for saving.

In some embodiments, step 660 may involve "side-loading" to a separate playback device (e.g., a cellphone, gaming device, tablet computer, laptop computer). Side-loading may similarly involve the portion of the omnibus channel file (and possibly the portion of the omnibus bookmark file) being stored to the playback device as described above. Additionally, transcoding may be performed to place the stored audio and/or video in a format appropriate for the separate playback device. For instance, for a cellular phone having a small screen, a reduced resolution may be used for the video stored to the separate playback device. An MPEG-4 level compression may be output from transcoding. In some embodiments, regardless of the separate playback device, a single resolution of video is produced by the transcoding. Due to copyright laws, whenever a copy of a television program is copied to a separate playback device, the television program may be removed from the television receiver regardless of whether deletion of the television program from the television receiver is scheduled to occur. In other embodiments, having multiple copies may be permissible. Side-loading may also occur after step 660. If performed after step 660, the individual file(s) for the television program may be transcoded and moved or copied to the separate playback device.

At step 670, after the individual files created at step 660, the omnibus channel file and the omnibus bookmark file may be deleted. At step 680, the catalog database may be updated. Updating the catalog database may include removing entries for the television programs stored as part of the omnibus channel file. Further, updating the catalog database may include modifying the existing entry for the television program saved to the individual file. Such modification may include updating the file offset (which may be zero because the television program is in a file containing only the television program) and updating the file name and/or location such that the catalog database entry for the television program points to the individual program file containing the television program. In some embodiments, rather than modifying the existing entry for the television program, the existing entry for the television program may be deleted in a new entry in the catalog database may be created.

Whether a television program is stored in an omnibus channel file or in a separate program file, a user may request playback via the DVR functionality of the television receiver. If playback of a television program is requested by a user, the catalog database may be used to locate the recording for playback. Playback of a television program from an omnibus channel file may involve the catalog database being used to determine the omnibus channel file in which the television program requested by the user is stored and a file offsets at which the television program begins within the omnibus channel file. Bookmark data about the television program may be accessed from the omnibus bookmark file. If a television program has been copied to an individual file, the catalog database may point to that file for playback (no offset indication may be necessary because only the television program is present in the individual file). A corresponding bookmark file may be present for the individual file.

Figure 7:
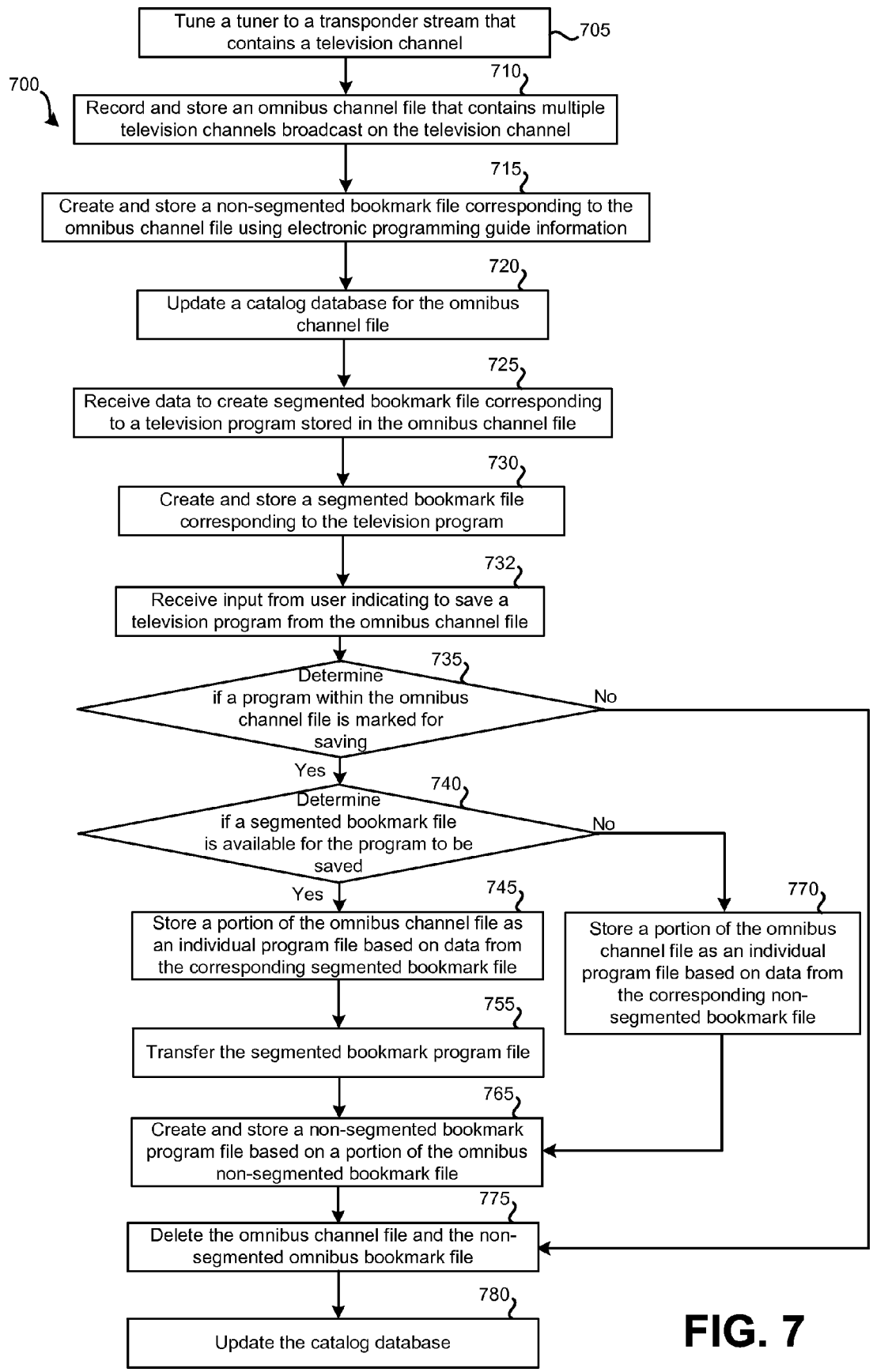
FIG. 7 illustrates another embodiment of a method for extracting a television program from an omnibus channel file.

FIG. 7 illustrates an embodiment of a method 700 for extracting a television program from an omnibus channel file and saving it to an individual program file. Method 700 may be performed using a television receiver, such as a set top box. Method 700 may involve data being received from a television service provider, such as via satellite television distribution system 100 of FIG. 1. It should be understood that in other embodiments of method 700, other forms of provider systems may be used, such as cable television distribution systems or an IP television distribution system. Means for performing method 700 include television receivers, television service provider systems, and computer systems (which may be incorporated as part of a television receiver and/or television service provider system). Method 700 may represent a more detailed embodiment of method 600 of FIG. 6. For example, in method 700 segmented bookmark files may be created in addition to the (non-segmented) omnibus bookmark files and the (non-segmented) individual program bookmark files.

At step 705, a tuner of the television receiver may be tuned to a transponder stream that contains a television channel to be recorded. In some embodiments, multiple television channels may be recorded at the same time. Further, in some embodiments, the multiple television channels may be received via a single tuner of the television receiver. As an example, four television channels may be recorded simultaneously (such as during primetime), wherein each of the television channels is received by the television receiver using a single tuner.

At step 710, and omnibus channel file may be recorded and stored for the television channel tuned to at step 705. The omnibus channel file recorded and stored may contain multiple television programs which were broadcast on the television channel within the time period during which recording occurred. The recording of the omnibus channel file may be stored to storage arrangement, such as a hard drive partition, dedicated to storage of such omnibus channel files. Multiple omnibus channel files, for different channels, may be recorded and stored simultaneously. For instance, omnibus channel files may be stored for each major television network during a period of time, such as prime time. The television channels, the dates, and the time periods for which omnibus channel files are created may be selected by the television service provider. The television service provider may configure the television receiver such that the recording of the omnibus channel files occur according to the schedule selected by the television service provider.

At step 715, a non-segmented bookmark file corresponding to the omnibus channel file may be created and stored. Because this bookmark file contains information on each television program present within the omnibus channel file, the bookmark file may be referred to as a (non-segmented) omnibus bookmark file. Non-segmented indicates that segments within the bookmark file are not denoted. The non-segmented omnibus bookmark file may be created based on information present within an electronic programming guide (EPG) stored by the television receiver. According to EPG data, when an event transition occurs (one television program ending and another beginning) for the television channel being recorded, an entry may be made in the non-segmented omnibus bookmark file that indicates a file offset, a program identifier (which may be created by the television receiver), and information about television program (e.g., title, description, series name, rating). The file offset may be based on the file size of the omnibus channel file (e.g., measured in bytes) at the (approximate) time of the event transition. The omnibus bookmark file may be named to match the omnibus channel file, with a different file extension (such as .bm).

In response to each event transition, an entry may be made within a catalog database maintained by the television receiver at step 720. The entry in the catalog database may indicate at least: the program identifier, a file name of the omnibus channel file (which may be named after the program identifier of the first television program recorded as part of the omnibus channel file), and the file offset. Therefore, based on the entry in the catalog database, information about the television program (via the non-segmented omnibus bookmark file) and the location of the television program (via the filename of the omnibus channel file and the file offset) may be determined. In some embodiments, rather than an entry in the catalog database being made in response to each event transition, entries may be made for each program recorded as part of the omnibus channel file following the recording of the omnibus channel file being completed.

At step 725, data may be received to create a segmented bookmark file for one or more television programs within the omnibus channel file created and stored at step 710. The data received at step 725 may be received from the television service provider, such as via a satellite television distribution system. The data to create a segmented bookmark file may contain information sufficient to identify the correct television program. This information may include a series identifier and an episode identifier. Such a series identifier and an episode identifier may have previously been received and stored for television programs recorded as part of omnibus channel files. For instance, a series identifier and an episode identifier may be present within the electronic programming guide information for television programs; such information may also be stored in the catalog database of the television receiver. The data used to create a segmented bookmark file may also include a more accurate start time and end time of the television program. The start time and end time may be based on when the television program was actually broadcast. For example, an agent monitoring the television channel for the television service provider may record when the television program actually begins and ends. The start and end time may vary from the scheduled start and end times indicated in the EPG information stored by the television receiver. Additionally, the data may indicate segments of the television program. These segments may be portions of the television program that exclude interspersed television commercials.

At step 730, a segmented bookmark file may be created for the television program using the data received at step 725. The segmented bookmark file may be specific to a television program. The segmented bookmark file may be stored on the storage arrangement used for storing the omnibus channel file that was stored at step 710. It should be understood that a segmented bookmark file may be created for each television program stored in the omnibus channel file. Further, it should be understood that the data necessary to create the segmented bookmark file received at step 725 may be received a period of time after the non-segmented bookmark file is created at step 715. For example, the data to create a segmented bookmark file at step 725 may not be provided to the television receiver until an hour, a day, or some other period of time after the non-segmented bookmark file and the omnibus channel file have been created and stored.

At step 732, if a television program of the omnibus channel file is to be saved, user input indicating that a television program of the omnibus channel file is to be saved may be received by the television receiver. For example, via the EPG of the television receiver, a user may select a television program for saving. An indication of the user input may be stored as a flag in the catalog database. Each entry within the catalog database corresponding to a television program of an omnibus channel file may have a flag bit (or some other form of indicator) that indicates whether the television program associated with the entry in the catalog database is to be saved or not. Accordingly, in response to user input indicating the television program is to be saved, the entry corresponding to the television program may be updated to reflect the saving designation in the catalog database.

Step 735 may be performed when the predetermined amount of time for which the omnibus channel file is to be saved has elapsed. For example, step 735 may be performed approximately two weeks after the omnibus channel file is recorded and stored at step 710 (other periods of time are also possible). At step 735, a determination may be made as to whether one or more of the television programs present within the omnibus channel file are to be saved. Determining whether one or more television programs present within the omnibus channel file are to be saved may include analyzing the catalog database stored by the television receiver. For each entry of the television program is stored within the omnibus channel file, a field within the catalog database may be examined. This field may be a single bit that indicates whether or not the television program is to be saved.

If at step 735 it is determined that no television programs within the omnibus channel file were marked for saving, method 700 may proceed to step 775. At step 775, the omnibus channel file, the non-segmented omnibus bookmark file, and each segmented bookmark file corresponding to television programs within the omnibus channel file may be deleted, such that the television programs stored within the omnibus channel file are no longer available. At step 780, the catalog database may be updated such that entries are no longer present for the television programs which are stored as part of the omnibus channel file.

Returning to step 735, if one or more television programs within the omnibus channel file were marked for saving, method 700 may proceed to step 740. For the remainder of method 700, it is assumed that a single television program of the omnibus channel file was selected for saving and was so indicated in the catalog database. It should be understood that in other embodiments more than one television program from within the omnibus channel file may be marked for saving.

In some embodiments, a user may have the ability to select that channel arrays are to no longer be recorded and/or stored. (This may be desired because the user would rather have additional storage space for specific television programs the user desires to record.) A user providing such an input to the television receiver may trigger step 735 to be performed for some or all television programs within omnibus channel files stored by the television receiver.

At step 740, it may be determined if a segmented bookmark file is available for the television program determined to be saved. To determine whether a segmented bookmark file is available, a file having a file name of the program identifier with a particular file extension (e.g., .seg) may be searched for. If the file exists, it may be determined that the segmented bookmark file is available; otherwise, it is not. In some situations, data used to create a segmented bookmark file may not have been received for a particular television program. In such situations, method 700 may proceed to step 770. At step 770, the portion of the omnibus channel file corresponding to the television program may be copied or moved to an individual program file. The individual program file may be stored to a separate storage arrangement, such as a separate storage device, a separate partition of a hard drive, or a separate folder on the same storage device (other ways of maintaining such files may also be possible). As such, individual program files may be stored to a separate storage arrangement from omnibus channel files. Accordingly, this may mean that storage to a first partition is managed by the television service provider while storage to a second partition is based on user selection of television programs for storage. The portion of the omnibus channel file stored may be based on the file offsets stored in the non-segmented bookmark file created at step 715 and/or the file offsets stored in the catalog database. Using these file offsets, which may be obtained from either the bookmark file or the catalog database, a start point and endpoint for the television program within the omnibus channel file may be determined. It should be understood that this start point and endpoint for the television program may be based on EPG data, which was received by the television receiver before the television program was broadcast. As such, the start and end times may be approximate and may not match with the actual start and end point of the television program as broadcast on the television channel. Accordingly, the individual program file may begin before or after the start of the television program; likewise, the end of the individual program file may be before the end of the television program or after the end of the television program.

In some embodiments, step 770 may involve side-loading to a separate playback device (e.g., a cellphone, gaming device, tablet computer, laptop computer). Side-loading may similarly involve the portion of the omnibus channel file (and possibly the portion of the omnibus bookmark file being stored to the playback device as described above. Additionally, transcoding may be performed to place the stored audio and/or video in a format appropriate for the separate playback device. For instance, for a cellular phone having a small screen, a reduced resolution may be used for the video stored to the separate playback device. Due to copyright laws, whenever a copy of a television program is copied to a separate playback device, the television program may be removed from the television receiver regardless of whether deletion of the television program from the television receiver is scheduled to occur. In other embodiments, having multiple copies may be permissible. Side-loading may also occur after step 770. If performed after step 770, the individual file(s) for the television program may be transcoded and moved or copied to the separate playback device.

Returning to step 740, it may be determined that a segmented bookmark file corresponding to the television program marked for saving is available. As such, method 700 may proceed to step 745. At step 745, the portion of the omnibus channel file to be stored as an individual program file may be determined based on a start and end time indicated in the segmented bookmark file. Within the segmented bookmark file, one or more segments may be defined. Each segment may be defined as a positive and negative frame offset from a base frame. The base frame may be identified based on associated closed captioning data. For instance, the unique strength which can be located in the closed captioning data may be used to identify the base frame. Such data necessary to define a segment may have been provided to the television receiver as part of the data necessary to create a segmented bookmark file at step 725. These segments defined by the segmented bookmark file may result in a different start and/or end time of the television program. In some embodiments, additional buffer time is built into (or added to) these start and/or end times. For instance, due to limitations of MPEG encoding, playback may be required to begin on an I-frame. As such by adding additional time before the start time of the television program, it may be more likely that an I-frame will occur before the television program beginning Therefore, a start and end time as indicated by the segmented bookmark file and possibly additional buffer time may be used to determine the portion of the omnibus channel file to be stored as the individual program file. In embodiments where a segmented bookmark file is available, file offsets indicated within the non-segmented bookmark file may not be used to determine the portion of the omnibus channel file that is transferred into the individual program file. The individual program file created from the portion of the omnibus channel file at step 745 may be stored to a separate storage arrangement from the omnibus channel file.

Side-loading to a separate playback device may occur as part of or following step 745. Side-loading may similarly involve the portion of the omnibus channel file (and possibly the portion of the omnibus bookmark file) being stored to the playback device. The segmented bookmark program file may also be transferred to the separate playback device such that segments can be skipped from playback on the separate playback device that contain commercials or other undesired content. Additionally, transcoding may be performed to place the stored audio and/or video in a format appropriate for the separate playback device. For instance, for a cellular phone having a small screen, a reduced resolution may be used for the video stored to the separate playback device. Due to copyright laws, whenever a copy of a television program is copied to a separate playback device, the television program may be removed from the television receiver regardless of whether deletion of the television program from the television receiver is scheduled to occur. In other embodiments, having multiple copies may be permissible.

At step 755, the segmented bookmark file associated with the television program to be saved may be transferred from the storage arrangement used to store the omnibus channel file to another storage arrangement that is used to store the individual program file.

At step 765, from the non-segmented omnibus bookmark file, an individual non-segmented bookmark file may be created for the television program. The non-segmented individual bookmark file may also be stored to a different storage arrangement along with the individual program file and the transferred segmented bookmark file. The non-segmented individual bookmark file may contain only metadata that corresponds to the particular television program. Based on the file offset of the television program to be saved, the metadata to be saved for the television program may be identified from within the omnibus bookmark file. As such, following step 765, an individual program file, a non-segmented individual bookmark file, and a segmented bookmark file may be stored for the television program selected by the user for saving to a user-controlled storage arrangement.

At step 775, the omnibus channel file and the non-segmented omnibus bookmark file may be deleted. At step 780, the catalog database may be updated. Updating the catalog database may include removing entries for the television programs stored as part of the omnibus channel file. Further, updating the catalog database may include modifying the existing entry for the television program saved to the individual file. Such modification may include updating the file offset (which may be zero because the television program is in a file containing only the television program) and updating the file name and/or location such that the catalog database entry for the television program points to the individual program file containing the television program. In some embodiments, rather than modifying the existing entry for the television program, the existing entry for the television program may be deleted in a new entry in the catalog database may be created.

Playback of the television program may be available until the user selects the television program for deletion. Playback of the television program may be based on segments indicated within the segmented bookmark file. Such segments may avoid commercial breaks interspersed within the television program. Information about the television program, such as a title and description, may be available within the non-segmented bookmark file for the television program.

Whether a television program is stored in an omnibus channel file or in a separate program file, a user may request playback via the DVR functionality of the television receiver. If playback of a television program is requested by a user, the catalog database may be used to locate the recording for playback. Playback of a television program from an omnibus channel file may involve the catalog database being used to determine the omnibus channel file in which the television program requested by the user is stored and a file offsets at which the television program begins within the omnibus channel file. Bookmark data about the television program may be accessed from the omnibus bookmark file. If a television program has been copied to an individual file, the catalog database may point to that file for playback (no offset indication may be necessary because only the television program is present in the individual file). A corresponding bookmark file may be present for the individual file. If a segmented bookmark file is available for the television program for which playback is requested, the segmented bookmark file may be used to skip undesirable content (e.g., commercials) and/or adjust the start/end times of playback of the television program, whether the television program is played back from an omnibus channel file or from an individual program file.

Figure 8:
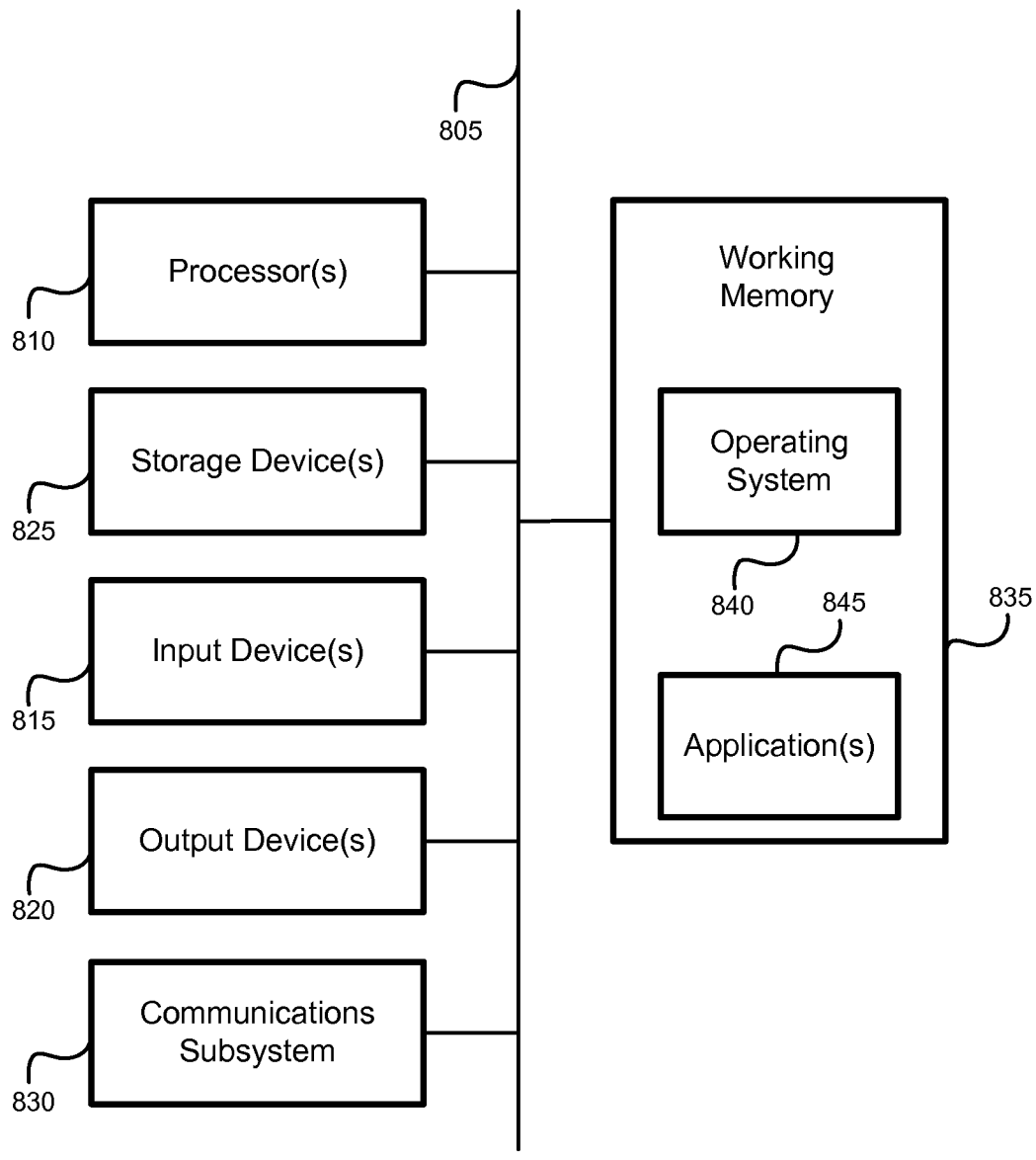
FIG. 8 illustrates an embodiment of a computer system.

A computer system as illustrated in FIG. 8 may be incorporated as part of the previously described computerized devices. For example, computer system 800 can represent some of the components of the television receivers (e.g., set top boxes) discussed herein. Further, computer system 800 may be part of a television service provider system. FIG. 8 provides a schematic illustration of one embodiment of a computer system 800 that can perform the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver, comprising:
   a tuner;
   one or more processors; and
   a non-transitory computer-readable storage medium communicatively coupled with and readable by the one or more processors and having stored therein processor-readable instructions which, when executed by the one or more processors, cause the one or more processors to:
      tune the tuner to a television channel;
      create and store an omnibus channel file comprising a plurality of television programs broadcast consecutively on the television channel over a period of time;
      after a predefined period of time, select the omnibus channel file for deletion;
      determine a television program of the plurality of television programs that is to receive extended storage;
      store a segmented bookmark file that identifies a plurality of segments within the omnibus channel file identified by a television service provider as corresponding to the television program;
      determine the segmented bookmark file is stored for the television program to receive extended storage;
      store a portion of the omnibus channel file as a separate individual program file such that information from the segmented bookmark file is used to define the start and end of the portion stored to the separate individual program file from the omnibus channel file, wherein the portion of the omnibus channel file corresponds to the television program of the plurality of television programs; and
      after storing the portion of the omnibus channel file as the separate individual program file, delete the omnibus channel file.

2. The television receiver of claim 1, wherein the processor-readable instructions, when executed by the one or more processors, are further configured to cause the one or more processors to:
   receive a user-provided indication that requests extended storage of the television program of the plurality of television programs, wherein:
      the processor-readable instructions, which are configured to cause the one or more processors to determine the television program of the plurality of television programs that is to receive extended storage, use the user-provided indication in performing the determination.

3. The television receiver of claim 1, wherein:
   the processor-readable instructions, which are configured to cause the one or more processors to record the omnibus channel file containing the plurality of television programs broadcast consecutively on the television channel over the period of time to the non-transitory computer-readable storage medium, are further configured to cause the omnibus channel file to be recorded to a first folder of the non-transitory computer-readable storage medium; and
   the processor-readable instructions, which are configured to cause the one or more processors to store the portion of the omnibus channel file as the individual program file, are further configured to cause the individual program file to be stored to a second folder of the non-transitory computer-readable storage medium.

4. The television receiver of claim 1, wherein the processor-readable instructions, which are configured to cause the one or more processors to tune the tuner to the television channel, are further configured to cause the tuner to tune to a transponder stream comprising packetized data for a plurality of television channels that comprises the television channel;
   the processor-readable instructions further comprise additional processor-readable instructions which are configured to cause the one or more processors to:
      record omnibus channel files for each television channel of the plurality of television channels over the period of time.

5. The television receiver of claim 1, wherein the processor-readable instructions which, when executed by the one or more processors, are further configured to cause the one or more processors to:
   maintain a catalog database stored by the non-transitory computer-readable storage medium, wherein the catalog database indicates:
      a plurality of omnibus channel files stored by the television receiver; and
      a plurality of television program identifiers, wherein each television program identifier of the plurality of television program identifiers corresponds to a television program that is stored within the plurality of omnibus channel files.

6. The television receiver of claim 5, wherein:
   the catalog database further indicates a plurality of byte offsets, wherein each byte offset is linked to a television program identifier of the plurality of television program identifiers; and
   each byte offset indicates a number of bytes preceding a designated start point of a television program within an omnibus channel file of the plurality of omnibus channel files, wherein the designated start point is based on an electronic programming guide event transition.

7. The television receiver of claim 1, wherein the processor-readable instructions which, when executed by the one or more processors, are further configured to cause the one or more processors to:
   while recording the omnibus channel file, when an electronic programming guide event transition corresponding to the television program occurs, determine a byte offset within the omnibus channel file corresponding to the television program using a file size determination of the omnibus channel file.

8. The television receiver of claim 1, wherein the processor-readable instructions, when executed by the one or more processors, are further configured to cause the one or more processors to:
create a non-segmented omnibus bookmark file linked with the omnibus channel file, wherein the non-segmented omnibus bookmark file indicates:
electronic programming guide information for each television program within the omnibus channel file; and
packet identifiers for audio and video streams within the omnibus channel file.

9. The television receiver of claim 8, wherein the processor-readable instructions, when executed by the one or more processors, are further configured to cause the one or more processors to:
delete the non-segmented omnibus bookmark file from the non-transitory computer-readable storage medium when deleting the omnibus channel file from the non-transitory computer-readable storage medium.

10. The television receiver of claim 8, wherein the processor-readable instructions, when executed by the one or more processors, are further configured to cause the one or more processors to:
after creating the non-segmented omnibus bookmark file, create a segmented bookmark file, wherein:
the segmented bookmark file identifies a plurality of segments within the omnibus channel file identified by a television distribution service provider.

11. The television receiver of claim 10, wherein each segment of the plurality of segments is defined based on a positive frame offset and a negative frame offset from a frame that corresponds to a string of characters being present in closed captioning data.

12. A method for storing a television program, comprising:
tuning, by a television receiver, a tuner to a television channel;
creating and storing, by the television receiver, an omnibus channel file comprising a plurality of television programs broadcast consecutively on the television channel over a period of time to a non-transitory computer-readable storage medium;
after a predefined period of time, selecting, by the television receiver, the omnibus channel file for deletion;
determining, by the television receiver, the television program of the plurality of television programs that is to receive extended storage;
storing, by the television receiver, a segmented bookmark file that identifies a plurality of segments within the omnibus channel file identified by a television service provider as corresponding to the television program;
determining, by the television receiver, the segmented bookmark file is stored for the television program to receive extended storage;
storing, by the television receiver, a portion of the omnibus channel file as a separate individual program file such that information from the segmented bookmark file is used to define the start and end of the portion stored to the separate individual program file from the omnibus channel file, wherein the portion of the omnibus channel file corresponds to the television program of the plurality of television programs; and
after storing the portion of the omnibus channel file as the separate individual program file, deleting, by the television receiver, the omnibus channel file.

13. The method for storing the television program of claim 12, further comprising:
receiving, by the television receiver, a user-provided indication that requests extended storage of the television program of the plurality of television programs, wherein:
determining the television program of the plurality of television programs that is to receive extended storage uses the user-provided indication in performing the determination.

14. The method for storing the television program of claim 12, wherein
recording the omnibus channel file containing the plurality of television programs broadcast consecutively on the television channel over the period of time to the non-transitory computer-readable storage medium, comprises causing the omnibus channel file to be recorded to a first folder of the non-transitory computer-readable storage medium; and
storing the portion of the omnibus channel file as the individual program file comprises causing the individual program file to be stored to a second folder of the non-transitory computer-readable storage medium.

15. The method for storing the television program of claim 12, wherein tuning the tuner to the television channel comprises tuning to a transponder stream comprising packetized data for a plurality of television channels that comprises the television channel;
the method further comprising: recording omnibus channel files for each television channel of the plurality of television channels over the period of time.

16. The method for storing the television program of claim 12, further comprising:
maintaining, by the television receiver, a catalog database, wherein the catalog database indicates:
a plurality of omnibus channel files stored by the television receiver; and
a plurality of television program identifiers, wherein each television program identifier of the plurality of television program identifiers corresponds to a television program that is stored within the plurality of omnibus channel files.

17. The method for storing the television program of claim 16, wherein
the catalog database further indicates a plurality of byte offsets, wherein each byte offset is linked to a television program identifier of the plurality of television program identifiers; and
each byte offset indicates a number of bytes preceding a designated start point of a television program within an omnibus channel file of the plurality of omnibus channel files, wherein the designated start point is based on an electronic programming guide event transition.

18. The method for storing the television program of claim 12, further comprising:
while recording the omnibus channel file, when an electronic programming guide event transition corresponding to the television program occurs, determining a byte offset within the omnibus channel file corresponding to the television program using a file size determination of the omnibus channel file.

19. The method for storing the television program of claim 12, further comprising:
creating, by the television receiver, a non-segmented omnibus bookmark file linked with the omnibus channel file, wherein the non-segmented omnibus bookmark file indicates:
electronic programming guide information for each television program within the omnibus channel file; and packet identifiers for audio and video streams within the omnibus channel file.

20. The method for storing the television program of claim 19, further comprising:
deleting, by the television receiver, the non-segmented omnibus bookmark file from the non-transitory computer-readable storage medium when deleting the omnibus channel file from the non-transitory computer-readable storage medium.

21. The method for storing the television program of claim 19, further comprising:
after creating the non-segmented omnibus bookmark file, creating, by the television receiver, a segmented bookmark file, wherein:
the segmented bookmark file identifies a plurality of segments within the omnibus channel file identified by a television distribution service provider.

* * * * *